US012769159B2

(12) United States Patent
Zhao et al.

(10) Patent No.: US 12,769,159 B2
(45) Date of Patent: Oct. 20, 2026

(54) BALUN-BASED DIFFERENTIAL OPTICAL MODULATOR

(71) Applicant: HyperLight Corporation, Cambridge, MA (US)

(72) Inventors: Lingfei Zhao, Cambridge, MA (US); Jeffrey Cole Holzgrafe, Lexington, MA (US); Christian Reimer, Wellesley, MA (US); Mian Zhang, Cambridge, MA (US); Sean P. Anderson, Macungie, PA (US)

(73) Assignee: HyperLight Corporation, Cambridge, MA (US)

( * ) Notice: Subject to any disclaimer, the term of this patent is extended or adjusted under 35 U.S.C. 154(b) by 0 days.

(21) Appl. No.: 19/401,045

(22) Filed: Nov. 25, 2025

(65) Prior Publication Data

US 2026/0147233 A1 May 28, 2026

Related U.S. Application Data

(60) Provisional application No. 63/725,469, filed on Nov. 26, 2024.

(51) Int. Cl.
*G02F 1/035* (2006.01)

(52) U.S. Cl.
CPC .................................. *G02F 1/0356* (2013.01)

(58) Field of Classification Search
CPC ..................................................... G02F 1/0356
See application file for complete search history.

(56) References Cited

U.S. PATENT DOCUMENTS

| | | | | |
|---|---|---|---|---|
| 6,522,793 | B1 | 2/2003 | Szilagyi | |
| 11,914,263 | B2 * | 2/2024 | Buckwalter | G02F 1/212 |
| 2003/0227666 | A1 | 12/2003 | Bridges | |
| 2004/0126050 | A1 | 7/2004 | Claydon | |
| 2015/0078754 | A1 * | 3/2015 | Aflatouni | H03K 3/42 398/116 |
| 2020/0081314 | A1 | 3/2020 | Parvizi | |
| 2021/0373409 | A1 | 12/2021 | Williams | |
| 2023/0314851 | A1 | 10/2023 | Kataoka | |
| 2024/0184149 | A1 * | 6/2024 | Holzgrafe | G02F 1/2255 |

(Continued)

FOREIGN PATENT DOCUMENTS

| | | | |
|---|---|---|---|
| CN | 116841060 | 10/2023 | |
| WO | WO-2014043590 A1 * | 3/2014 | H03K 3/42 |
| WO | 2018122006 | 7/2018 | |

OTHER PUBLICATIONS

Arif et al., "Loss optimization of coplanar strips for CMOS RFICs." 2009 Asia Pacific Microwave Conference. IEEE, 2009.

(Continued)

*Primary Examiner* — Tina Wong
(74) *Attorney, Agent, or Firm* — Van Pelt, Yi & James LLP

(57) ABSTRACT

A photonics device is described. The photonics device includes an optical device and a balun. The optical device includes a waveguide and a signal electrode. The waveguide includes a lithium-containing electro-optic material. The signal electrode varies the electric field at the waveguide. The balun is configured to convert a differential input signal to a single-ended output signal. The balun is connected to the signal electrode and provides the signal electrode with the single-ended output signal.

17 Claims, 18 Drawing Sheets

(56) References Cited

U.S. PATENT DOCUMENTS

2024/0377695 A1 11/2024 Aimone

OTHER PUBLICATIONS

Baek et al. "94-GHz log-periodic antenna on GaAs substrate using air-bridge structure." IEEE Antennas and Wireless Propagation Letters 8 (2009): 909-911.
Baeuerle et al. "120 GBd plasmonic Mach-Zehnder modulator with a novel differential electrode design operated at a peak-to-peak drive voltage of 178 mV." Optics express 27.12 (2019): 16823-16832.
Dong, et al. "Coplanar transitions based on aluminum nitride interposer substrate for terabit transceivers." 2017, Proceedings of the 47th European Microwave Conference. IEEE, 2017.
Gomez Saavedra et al. "Multi-channel Mach-Zehnder IQ modulator PICs on InP for hybrid OFDM transmitter integration." 2016 18th International Conference on Transparent Optical Networks (ICTON). IEEE, 2016.
Kim et al. "Ultra-wideband (from DC to 110 Ghz) CPW to CPS transition." Electronics Letters 38.13 (2002): 622-623.
Klotz et al. "Coplanar stripline antenna design for optically detected magnetic resonance on semiconductor quantum dots." Review of Scientific Instruments 82.7 (2011).
Min, et al. "Ultra-wideband differential line-to-balanced line transitions for super-high-speed digital transmission." MDPI Sensors 22.18 (2022): 6873. https://doi.org/10.3390/s22186873.
Prieto et al. "CPS structure potentialities for MMICs: a CPS/CPW transition and a bias network." 1998 IEEE MTT-S International Microwave Symposium Digest (Cat. No. 98CH36192). vol. 1. IEEE, 1998.
Saadi et al. "Low-loss broadband (DC to 220 Ghz) S-CPW to S-CPS transition for S-CPS coplanar probing." Electronics Letters 55.21 (2019): 1137-1139.
Trifunovic et al., "Review of printed Marchand and double Y baluns: Characteristics and application." IEEE Transactions on Microwave Theory and Techniques 42.8 (1994): 1454-1462.

* cited by examiner

1700A

1700B

1700C

1700D

BALUN-BASED DIFFERENTIAL OPTICAL MODULATOR

CROSS REFERENCE TO OTHER APPLICATIONS

This application claims priority to U.S. Provisional Patent Application No. 63/725,469 entitled BALUN-BASED DIFFERENTIAL OPTICAL MODULATOR filed Nov. 26, 2024 which is incorporated herein by reference for all purposes.

BACKGROUND OF THE INVENTION

In modern high-speed optical communications (e.g., baud rates above 40 Gbaud), differential signals are generally used for driving optical modulators. This is because differential signals have advantages over single-ended signals. Differential driver amplifiers (differential drivers) may provide a larger voltage swing than comparable single-ended drivers. This may facilitate design of the corresponding differential optical modulator (i.e. a modulator that uses differential signals). Differential drivers may be simpler to design and often have better performance. For example, differential drivers may have improved linearity. In addition, the use of differential signals may help to reduce crosstalk and common-mode noise between channels of an optical modulator. Thus, the use of differential drivers is desirable for high speed optical communications.

Lithium-containing (LC) electro-optic materials, such as lithium niobate (LN) and/or lithium tantalate (LT), are of interest for use in high speed optical devices. Thin film LC (TFLC) optical devices may support high data rates and low losses, which is desirable in applications such as data communication and/or telecommunication. TFLC optical devices may also exhibit a large electro-optic effect, which may allow for a lower V-pi (voltage required to provide a phase shift of pi). However, for optical platforms such as TFLC, a high performance single-ended drive optical modulator (i.e., modulators driven by a single ended signal) may be easier to design than a differential drive version. Stated differently, a TFLC differential optical modulator driven by a differential signal may face challenges that corresponding single-ended TFLC modulators do not. Such differential modulators may suffer from reduced bandwidth or higher drive voltage swing requirements. Consequently, such differential modulators may be unsuitable for wideband applications and/or may not achieve the higher modulation index benefits generally expected from the use of differential drivers. Accordingly, photonic devices usable in high speed optical communications, particularly LC photonic devices, are still desired.

BRIEF DESCRIPTION OF THE DRAWINGS

Various embodiments of the invention are disclosed in the following detailed description and the accompanying drawings.

DETAILED DESCRIPTION

Figure 1A:
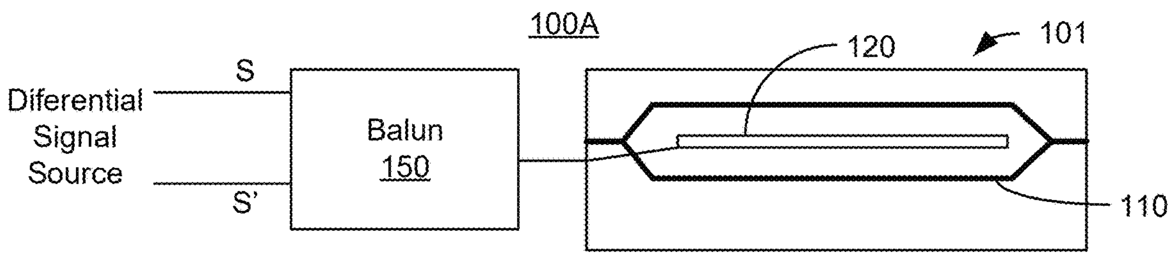
FIGS. 1A-1E depict embodiments of photonics devices including a thin film lithium-containing optical device and a balun for driving the optical device with a single-ended signal.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term ‘processor’ refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In modern high-speed optical communications, differential signals may be used to drive optical modulators (differential optical modulators). Differential signals are provided by differential drivers, which may have a larger voltage swing and improved linearity. The corresponding differential optical modulators may have reduced crosstalk and reduced common-mode noise than optical modulators driven by single-ended signals and drivers. Thin film lithium-containing (TFLC) modulators are also desired to be used in applications such as high-speed optical communication. Thus, it would be desirable to use TFLC modulators (e.g. thin film lithium niobate (TFLN) and/or thin film lithium tantalate (TFLT) modulators) with differential signals. However, optical modulators that are single-ended (i.e., driven by a single-ended signal) may be easier to implement in platforms such as TFLC. Differential modulators in such platforms may also suffer from reduced bandwidth and/or higher drive voltage requirements as compared to other differential modulators. Consequently, high-performance TFLC photonics devices usable in high speed communication are still desired.

A photonics device is described. The photonics device includes an optical device, such as a modulator, and a balun. The optical device includes a waveguide and a signal electrode. The waveguide includes a lithium-containing electro-optic material. The lithium-containing material may be a thin film lithium-containing (TFLC) electro-optic material. For example, the waveguide may include or consist of thin film lithium niobate (TFLN) and/or thin film lithium tantalate (TFLT). The signal electrode varies the electric field at the waveguide, for example by carrying a signal. The optical device may be a traveling wave modulator in which the velocity of a signal (e.g. a microwave signal) through the signal electrode is desired to be well matched to the velocity of the optical signal through the waveguide (i.e., velocity matching is desirable). The balun is configured to convert a differential input signal to a single-ended output signal. The balun is connected to the signal electrode and provides the signal electrode with the single-ended output signal. Thus, the signal electrode carries the single-ended output signal that is based on the differential signal. Through the use of a passive device (i.e., the balun), a differential signal may be used in conjunction with a single-ended TFLC optical devices. Consequently, the benefits of differential drivers may be combined with the benefits of TFLC electro-optic materials in a single-ended modulator configuration. For example, improved linearity of the differential driver may be combined with the high speed, large electro-optic effect, and low losses of TFLC modulators without suffering a significant reduction in bandwidth or increase in V-pi.

The balun may have inputs connected to a digital signal processor and/or a differential driver. The output(s) of the balun may be coupled to the optical device. For example, the differential input signal includes a positive signal and a negative signal. As used herein, a positive signal and a negative signal may, but need not, be symmetric with respect to ground. Further, positive and negative signals merely indicate that the signals together form a differential signal and may not imply a particular polarity. The balun may include first and second inputs and first and second outputs. The first and/or the second output may be tapered. The first input receives the positive signal. The second input receives the negative signal. The first output is coupled to the signal electrode and provides the positive signal to the signal electrode. The second output is coupled with ground electrodes of the optical device and provides the negative signal to the ground electrodes. In some embodiments, the ground electrodes are symmetrically distributed around the signal electrode. In some embodiments, the second output divides a current for the negative signal evenly between the plurality of ground electrodes. In some embodiments, a portion of each of the electrodes has a first width, the signal electrode has a second width, and the first width is at least twice the second width.

In some embodiments, the photonics device includes a termination network. The termination network may be considered part of the optical devices. At least a first portion of the termination network is coupled with a portion of the signal electrode. A second portion of the termination network may be coupled with the ground electrodes.

In some embodiments, the balun also includes first and second ground inputs. The first and second ground inputs are coupled with additional grounds of the optical device. In some embodiments, the additional grounds are coupled with the ground electrodes.

In some embodiments the differential input signal includes a positive signal and a negative signal. In such embodiments, the balun further includes wire bonds coupling the positive signal to the signal electrode and the negative signal to ground electrodes of the optical device. In some such embodiments, a first portion of the wire bonds couple the positive signal to the signal electrode and a second portion of the wire bonds couple the negative signal to the ground electrodes. First wire bonds of the first portion of the wire bonds are interleaved with second wire bonds of the second portion of the wire bonds.

In some embodiments, the optical device is in a photonics integrated circuit. At least a portion of the balun being integrated into the photonics integrated circuit. In some such embodiments, the balun is integrated into the photonics integrated circuit.

A photonics integrated circuit (PIC) is described. The PIC includes an optical modulator and a balun. The optical modulator includes a waveguide and a signal electrode. The waveguide includes a lithium-containing electro-optic material (e.g., a TFLC material), such as TFLN and/or TFLT. The signal electrode varies the electric field in or near the waveguide. The optical modulator is a traveling wave modulator. The balun has inputs and is configured to convert a differential input signal to a single-ended output signal. The balun receives the differential input signal at the inputs, is connected to the signal electrode, and provides to the signal electrode the single-ended output signal.

In some embodiments, the differential input signal includes a positive signal and a negative signal. The inputs receive the positive signal and the negative signal. The balun further includes a first output that is coupled to the signal electrode and provides the positive signal to the signal electrode. The balun also includes a second output coupled with ground electrodes of the optical modulator. The second output provides the negative signal to the ground electrodes.

In some embodiments, the optical modulator includes a first region proximate to the balun, a modulation region, and a second region. The modulation region is between the first region and the second region. In such embodiments, the second region further includes a termination network coupled with the signal electrode.

A method for providing a photonics device is described. The method includes providing an optical device. The optical device includes a waveguide and a signal electrode. The waveguide includes a lithium-containing electro-optic material. The method also includes providing a balun that is connected to the signal electrode. The balun is configured to convert a differential input signal to a single-ended output signal. The balun provides the signal electrode with the single-ended output signal.

In some embodiments, the differential input signal includes a positive signal and a negative signal. The balun further includes a first input configured to receive the positive signal, a second input configured to receive the negative signal, and a first output coupled to the signal electrode, and a second output coupled with ground electrodes of the optical device. The first output provides the positive signal to the signal electrode. The second output provides the negative signal to the ground electrodes. Providing the balun further includes providing a first metallization layer including the signal electrode, the first input, the second input, and the plurality of ground electrodes. In addition, conductive vias for the signal electrode and the first output are provided. Providing the balun also includes providing a second metallization layer coupling the first output with the signal electrode through the plurality of conductive vias.

Various features of the photonics devices are described herein. One or more of these features may be combined in manners not explicitly described herein. For example, TFLC optical modulator(s) may have varying configurations in combination with baluns having different configurations. For example, a balun may reside in a driver or digital signal processor (DSP) but have the configuration of inputs and outputs described for a balun on a photonics integrated circuit. Similarly, tapered, untapered outputs, symmetric outputs, or asymmetric outputs may be combined in baluns that are not explicitly shown. Further, another number of channels (e.g., modulators and baluns) and/or waveguides having other configurations (e.g. bent waveguides) may be used.

FIGS. 1A-1E depict embodiments of photonics devices 100A, 100B, 100C, 100D, and 100E including TFLC optical device 101 and balun 150 for driving optical device 101 with a single-ended signal. Optical device 101 is a single-ended optical device. Stated differently, optical device 101 utilizes a signal that is carried by one electrode (or other conductor) referenced to another electrode (or conductor) that may considered to be "ground". Photonics devices 100A, 100B, 100C, 100D, and 100E are analogous. Consequently, analogous components are similarly labeled.

Referring to FIG. 1A, photonics device 100A includes optical device 101 and balun 150. In some embodiments, optical device 101 is in a photonics integrated circuit (PIC). Optical device 101 includes waveguide 110 (which includes multiple arms in some regions) and signal electrode 120. Optical device 101 may thus be or include an optical modulator. Waveguide 110 may be a TFLC waveguide. Thus, waveguide 110 may include or consist of one or more lithium-containing electro-optic materials. For example, thin film lithium niobate (TFLN) and/or thin film lithium tantalate (TFLT) may be used in waveguide 110. In some embodiments, waveguide 110 may include other and/or additional materials exhibiting the Pockels effect.

The TFLC material used in waveguide 110 may also be formed into optical structure(s) in addition to waveguide 110. For example, optical device 101 may include splitters, mode converter(s), bends, polarization rotation beam splitter (s), and/or other structure(s). Thus, the TFLC material in TFLC optical device 101 has undergone one or more etches. At particular regions of TFLC optical device 101, the TFLC material has one or more thickness(es). In such region(s), for example, the TFLC material may be a single ridge only (e.g. a single thickness); a ridge and a slab (e.g., two thicknesses): a shaped structure including a ridge, a slab, and an intermediate layer (e.g. three thicknesses); and/or another structure. TFLC waveguide 110 and/or other structures may be encapsulated in cladding, such as silicon dioxide. In some embodiments, the TFLC layer from which waveguide 110 (and other structures) has a thickness of less than two micrometers, less than one micrometer, less than six hundred nanometers, less than five hundred nanometers, or less than four hundred nanometers, and at least fifty nanometers as formed. The thickness of TFLC waveguide 110 may be at least fifty nanometers. In some embodiments, the TFLC layer has a thickness of at least two hundred and fifty nanometers. For example, TFLC waveguide 110 may be nominally three hundred nanometers or three hundred and fifty nanometers thick with, for example, a 10-15 nanometer variation. The thickness of TFLC waveguide 110 (e.g. to the top of ridge 112) may be not more than three hundred nanometers, not more than three hundred and fifty nanometers, not more than four hundred nanometers, not more than five hundred nanometers, not more than six hundred nanometers, not more than seven hundred nanometers, not more than one micrometer, not more than 1.5 micrometer, and/or not more than two micrometers. In some embodiments, the thickness of TFLC waveguide 110 may at least more than three hundred nanometers, at least three hundred and fifty nanometers, at least four hundred nanometers, at least five hundred nanometers, at least six hundred nanometers, at least seven hundred nanometers, at least one micrometer, or at least 1.5 micrometer, Signal electrode 120 carries a single-ended signal that varies the electric field at waveguide 110. Thus, an optical signal carried by waveguide 110 may be modulated. In some embodiments, waveguide 110 may be considered a coplanar waveguide (a waveguide using electrode 120 that is an unbalanced and single ended transmission line). In some embodiments, ground electrodes (e.g. for a G-Signal-Ground or Ground-Signal-Signal-Ground) may be used, but are not shown in FIGS. 1A-1E. Signal electrode 120 may be an unbalanced and single ended transmission line type. In some embodiments, TFLC optical device 101 supports other modes such as a coplanar strip (CPS) mode in which a balanced transmission line made from two coupled microstrip transmission lines (S'S), is used to carry differential signals. Thus, optical device 101 is or includes a modulator. Although only a single modulator is shown, other and/or additional modulators and/or other or additional optical components may be present.

Optical device 101 may be a traveling wave modulator in which the velocity of a signal (e.g. a microwave signal)

through signal electrode is desired to be well matched to the velocity of the optical signal through the waveguide (i.e., velocity matching is desirable). For example, a velocity mismatch (or corresponding phase difference) of not more than twenty percent, not more than fifteen percent, not more than ten percent, or not more than five percent may be achieved.

Balun 150 receives a differential signal, S and S'. Stated differently, the signals provided to balun 150 are in a differential mode. Thus, duplicate signals (S and S') are carried on two conductors (e.g., in a transmission line), but the signal on one of the conductors is one hundred and eighty degrees out-of-phase with the signal on the other conductor. The differential voltage is total voltage drop between the two conductors. In some embodiments, there may be a nonzero common mode voltage (common mode voltage=(Vs+Vs')/2). If S and S' are AC coupled the common mode voltage is zero. Otherwise, the common mode voltage may be nonzero. Thus, S and S' can, but need not be symmetric around 0 volts. Further, S and S' (also referred to as the positive differential signal and the negative differential signal) are not intended to have particular polarities (e.g., positive with respect to ground or negative with respect to ground). Instead, S and S' are opposite in polarity with respect to some intermediate voltage that may or may not be ground. Thus, the differential signal input to balun 150 may be considered balanced. Balun 150 passively transforms the differential signal received to a single-ended output signal.

Balun 150 is configured to passively convert the differential input signal to a single-ended output signal. The single-ended signal provided by balun 150 to signal electrode 120 may be considered unbalanced. Thus, balun 150 transitions from a balanced differential line to an unbalanced, single-ended line. In some embodiments, balun 150 achieves this with reduced (e.g., minimal) reflection, optimized (e.g. maximal) transmission, and, in some embodiments, isolation. Balun 150 could be of many different designs, at least some of which are described herein. Thus, balun 150 may include but is not limited to a capacitively coupled quarter wave transmission line, a Marchand balun, a double Y balun, a flux coupled balun, and/or other configurations.

Balun 150 is connected to signal electrode 120 and provides signal electrode 120 with the single-ended output signal. Thus, signal electrode 120 carries the single-ended signal that is based on the differential signal received by balun 150. This single-ended signal may be used to modulate the optical signal carried by waveguide 110. Through the use of a passive device (i.e., balun 150), a differential signal may be used in conjunction with a single-ended TFLC optical devices 101. In some embodiments, balun 150 provides one signal of the differential signal pair (e.g. the positive, S signal) to signal electrode 120 and the other signal of the differential signal pair (e.g., the negative, S' signal) to ground electrodes (not shown) that may be on either side of signal electrode 120. In such an embodiment, the arms of waveguide 110 are generally between signal electrode 120 and the ground electrodes.

Balun 150 may be optimized for several performance metrics of photonics device 101A. Balun 150 may be configured to reduce or eliminate excitations of parasitic modes in a single-ended transmission line (e.g. signal electrode 120). For example, a single-ended coplanar waveguide (e.g. waveguide 110) may have slotline-like and microstrip-like parasitic modes. If balun 150 excites these modes, excess loss, reflections, chirp in optical device 101, or large crosstalk may be created. Balun 150 may also be optimized for a desired bandwidth and/or DC or near DC functionality. For optical fiber communication applications balun 150 may be effective from DC or near DC (e.g., DC to 1 MHz, to 10 MHz, or to 1 GHz) to at least the Nyquist frequency of the expected optical signals (e.g., greater than or equal to 20 GHz for modern optical communications, greater 50 GHz, or greater 100 GHz in various applications). This may make some common balun designs such as the Marchand balun less effective or inappropriate for modern high speed digital communications (e.g. baud rate(s) greater than 40 Gbaud). Thus, other designs such as those described herein may be used to provide a higher bandwidth.

Balun 150 may also be configured to mitigate losses. An insertion loss through balun 150 may lead to reduced drive voltage applied to optical device 101. As such, balun 150 may be optimized for less than 6 dB of insertion loss over the band of interest. If the insertion loss is greater than 6 dB, balun 150 may be configured to simply terminate one side of the differential pair and use the other side as a single-ended drive. In some embodiments, the insertion loss for balun 150 may be less than 3 dB over the band of interest, may be less than 1 dB over the band of interest, or may be less than 0.5 dB over the band of interest. Balun 150 may also be configured to limit dispersion. The group delay may be relatively flat across frequency to avoid signal degradation (eye diagram closure).

Balun 150 may also be configured for the appropriate impedance ratio. For electro-optic modulator 101, the single-ended impedance (e.g. of signal electrode 120) may be close to (within 40% or within 20%) or higher than the differential input impedance (for balun 150). This may allow photonics device 100 to take advantage of the step up in voltage. Balun 150 may also be configured for impedance matching and higher return loss. In some embodiments, the return loss may be greater than 5 dB, or greater than 10 dB across the band of interest. Balun 150 may optimize common mode return loss. Stability of driver 106 and channel crosstalk (for multiple modulators for optical device 101) may be susceptible to common mode reflections. Thus, the common mode return loss for balun 150 may be greater than 5 dB or greater than 10 dB over the frequency band of interest.

Balun 150 may also be configured to improve V-pi*L for TFLC optical device 101. In some embodiments, the measured differential V-pi*L versus optical loss may be similar to that measured in silicon photonics (e.g., at least 1 dB/mm and not more than 4 dB/mm). The measured differential V-pi*L in V*cm vs. loss measured in dB/mm may range from 0.5 Vcm to 3 Vcm with optical losses between 20 dB/mm and 0.001 dB/mm. In various embodiments, the optical loss for TFLC optical device 101 may be less than 10 dB/mm, less than 5 dB/mm, less than 1 dB/mm, or less than 0.1 dB/mm in various embodiments. Certain other balun metrics, such as balance and isolation, that may be important for other application may be less important for the embodiments described herein. These metrics may be sacrificed to some degree to improve or achieve the desired metrics for photonics device 101A.

In photonics device 100A, the benefits of differential drivers/differential driving signals may be combined with the benefits of TFLC electro-optic materials in a single-ended modulator configuration. For example, improved linearity of the differential driver may improve the differential signals S and S' provided to balun 150. The high speed, large electro-optic effect, and low losses of TFLC modulators 101 may be driven with such signals without suffering a significant reduction in bandwidth or increase in voltage swing that might be present if TFLC optical device 101 is a differential modulator. These benefits may be achieved with a passive device driving TFLC optical device 101.

Figure 1B:
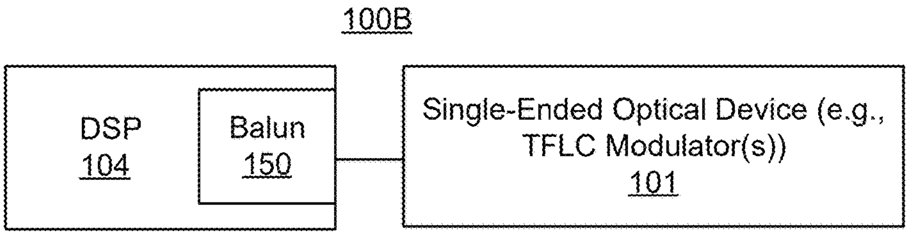

In some embodiments, balun 150 drives TFLC optical device 101. Thus, a driver is not connected between balun 150 and TFLC optical device 101. In some embodiments, no active component is connected between balun 150 and TFLC optical device 101. Balun 150 is between the electrode(s) of TFLC optical device 101 and the output of the differential signal source. For example, FIG. 1B depicts photonics device 100B that explicitly incorporates a digital signal processor (DSP) 104 for driving TFLC optical device 101. Balun 150 receives a differential signal from DSP 104 and provides a single-ended signal to TFLC optical device 101. For simplicity, waveguide 110 and electrode 120 are not explicitly shown in FIGS. 1B-1E. In the embodiment shown, balun 150 is incorporated into DSP 104. Photonics device 100B is, therefore, a driverless device. Signaling between DSP 104 and the PIC including optical device 101 is single-ended. In other embodiments, balun 150 may be a separate component.

Figure 1C:
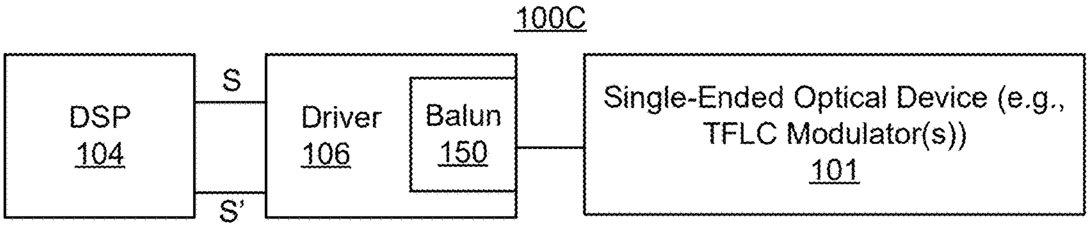

FIG. 1C depicts photonics device 100C. Photonics device 100C includes DSP 104 and driver 106. Driver 106 is a differential driver that receives differential input from DSP 104 and provides a differential signal to balun 150. Balun 150 converts the differential signal to a single-ended signal and provides the single-ended signal to TFLC optical device 101. In photonics device 100C, balun 150 is incorporated into driver 106. However, balun 150 is still used to drive TFLC optical device 101.

Figure 1D:
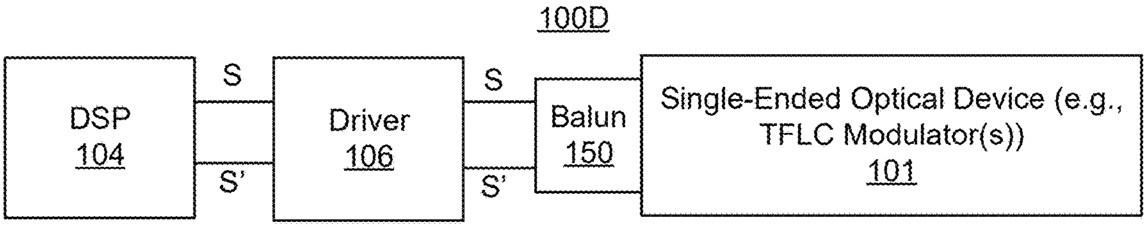

FIG. 1D depicts photonics device 100D. Photonics device 100D includes DSP 104 and driver 106. Driver 106 is a differential driver that receives differential input from DSP 104 and provides a differential signal to balun 150. Balun 150 converts the differential signal to a single-ended signal and provides the single-ended signal to TFLC optical device 101. In photonics device 100C, balun 150 is separate from driver 106. However, balun 150 is not incorporated into the same PIC as TFLC optical device 101. Instead, balun 150 may be integrated with TFLC optical device 101 as part of the packaging process. For example, balun 150 could be designed into the interposer PCB or ceramic substrate that routes the signal from driver 106 to the PIC on which TFLC optical device 101 resides. Balun 150 might be created using wire bonds, vias, bump bonding, or other packaging techniques between TFLC optical device 101 and the substrate, between TFLC optical device 101 and the driver 106, or between TFLC optical device 101 and any ASIC in a 2.5D or 3D packaging environment. Balun 150 could also be formed using packaging techniques between DSP 102 and driver 106, or at the output of driver 106. In other embodiments, balun 101 may simply be electrically connected to TFLC optical device 101.

Figure 1E:
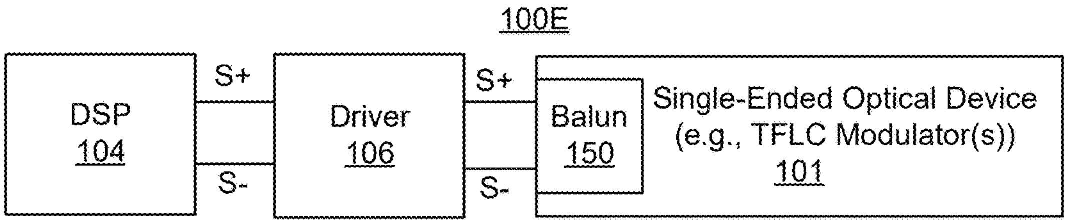

FIG. 1E depicts photonics device 100E. Photonics device 100E includes DSP 104 and driver 106. Driver 106 is a differential driver that receives differential input from DSP 104 and provides a differential signal to balun 150. Balun 150 converts the differential signal to a single-ended signal and provides the single-ended signal to TFLC optical device 101. In photonics device 100C, balun 150 is not only separate from driver 106 but also incorporated into the same PIC as TFLC optical device 101. Thus, balun 150 may be tightly integrated with TFLC optical device 101. Balun 150 and TFLC optical device 101 may be co-designed and co-optimized. Locating balun 150 on the same PIC as TFLC optical device 101 also reduces crosstalk earlier in the link due to converting to a single-ended signal at the last possible point. In other embodiments, balun 150 may be differently located. For example, a portion of balun 150 may be on the PIC in which TFLC optical device 101 is formed, while another portion is elsewhere (e.g. on an interposer or printed circuit board to which the PIC is connected).

Photonics devices 100B, 100C, 100D, and 100E may share the benefits of photonics device 100A. Thus, the advantages of differential drivers 106/differential driving signals may be combined with the benefits of TFLC electro-optic materials in a single-ended modulator configuration. For example, improved linearity, high speed communications (e.g. 40 Gbaud or higher), a large electro-optic effect, and low optical and/or microwave losses may be achieved without suffering a significant reduction in bandwidth or increase in voltage swing that might be present if TFLC optical device 101 is a differential modulator. For example, in some embodiments, photonics devices 100A, 100B, 100C, 100D, and/or 100E may operate from at or near DC up to at least 10 GHz, at least 20 GHz, at least 50 GHz, at least 100 GHz, at least 200 GHz, or at least 500 GHz.

Figure 2A:
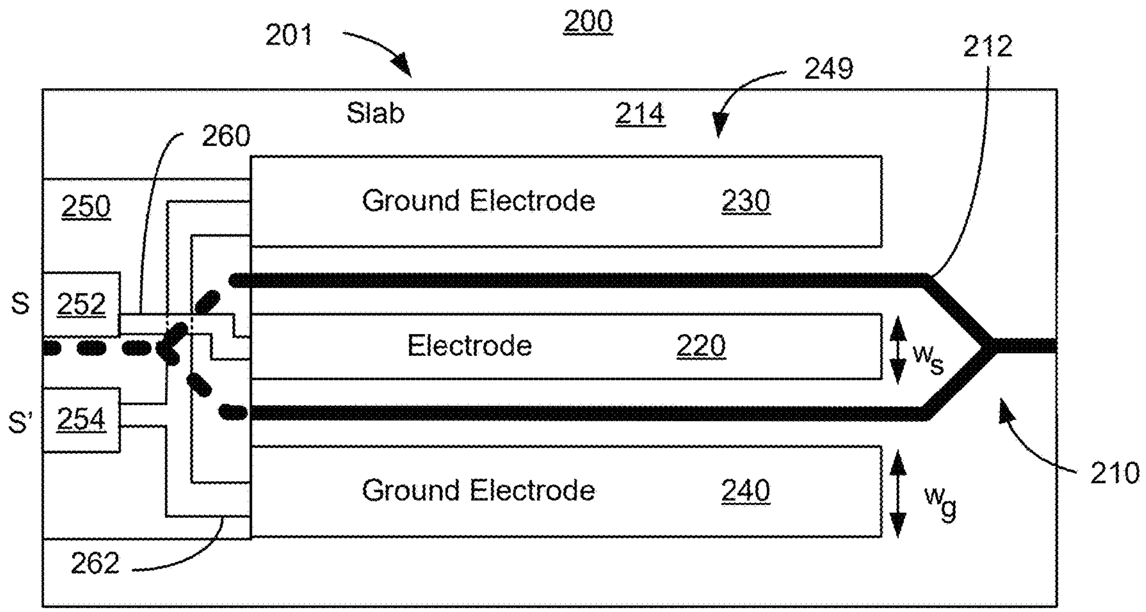
FIGS. 2A-2B depict an embodiment of a portion of a photonics device including a thin film lithium-containing optical device and a balun.
Figure 2B:
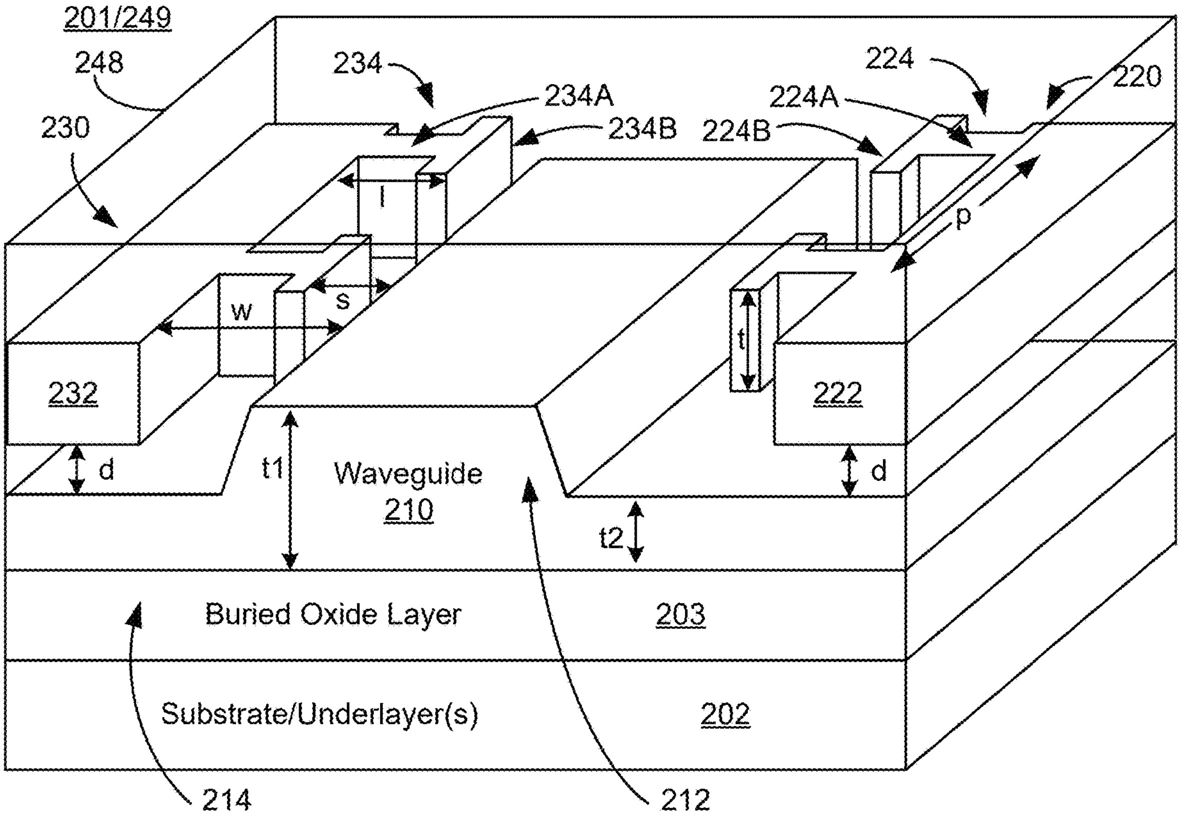

FIGS. 2A-2B depict an embodiment of a portion of TFLC photonics device 200. Photonics device 200 includes optical device 201 and balun 250 that are analogous to optical device 101 and balun 150, respectively. FIG. 2A is a plan view of a portion of photonics device 200. FIG. 2B is a perspective view of a portion of photonics device 200. In some embodiments, FIG. 2B depicts a portion of modulation region 249. FIGS. 2A-2B are not to scale. Only a portion of photonics device 200 is shown. Photonics device 200 may include other and/or additional structures that are not shown for simplicity. Further, although particular configurations are shown, other configurations are possible. In the embodiment shown, balun 250 is integrated with optical device 201 (e.g., on the same PIC). In some embodiments, balun 250 may be located elsewhere, for example as shown in photonics devices 100B, 100C, 100D, and 100E.

Photonics device 200 is on a substrate structure that includes substrate 202 and buried oxide (BOX) layer 203. In some embodiments, substrate 202 is a silicon substrate. Substrate 202 may also include other layers. In some embodiments, substrate 202 may be glass, quartz, silicon-on-insulator, and/or other low microwave loss dielectrics. Substrate 202 may be one hundred micrometers or more thick. BOX layer 203 may be a silicon dioxide layer. In some embodiments, BOX layer 203 may be at least three micrometers thick and not more than fifteen micrometers thick. In some embodiments, the substrate structure may be configured differently. Also shown is cladding 248, which may be formed of silicon dioxide.

Photonics device 200 includes waveguide 210 and electrodes 220, 230, and 240. In some embodiments, photonics device 200 may be configured as or include a modulator (or portion thereof). Thus, photonics device 200 may be considered to include modulation region 249. Other regions, such as a bend region, may be present. Modulator 200 is shown as configured as a Mach-Zehnder modulator. Other configurations for phase and/or amplitude modulation are possible. For clarity, only the portion of electrodes 220, 230, and 240 proximate to waveguide 210 are shown. Stated differently, electrodes 220, 230, and 240 are shown in modulation region 249.

Waveguide 210 may be considered to include ridge 212 as well as slab 214. Ridge 212 has a height, t1, greater than the height, t2, of slab 214. Although shown as trapezoids, ridge 212 and/or slab 214 have other shapes, such as rectangles and/or other analogous shapes. In addition, slab 214 may terminate closer to ridge 214 than at least a portion of electrode(s) 220 and/or 230. Photonics device 200 includes electro-optic optic material(s), such as TFLC materials (e.g. TFLN and/or TFLT). More specifically, ridge 212 and slab 214 include electro-optic materials, such as TFLC materials. In some embodiments, the waveguide 210 consists of TFLC materials such as TFLN and/or TFLT. In the embodiment shown, ridge 212 and slab 214 are formed of the same material. In some embodiments, ridge 212 and slab 214 may include different materials. Waveguide 210, and more particularly ridge 212, may be used to propagate the optical signal. The optical mode may be well confined to ridge 212 and/or ridge 212 in combination with a portion of nearby slab 214. Slab 214 provides increased electro-optic modulation efficiency. In particular, slab 214 aids in directing the electric field generated by the signal(s) in electrodes 220, 230, and 240 to optical mode 213 in modulation region 249. Thus, a higher modulation for a given electric field may be obtained. As a result, V-pi (and V-pi*L) may be reduced.

Electrodes 220, 230, and 240 may carry electrode signals used to modulate the optical signals (e.g. light) carried by waveguide 210 via electro-optic modulation. Electrode(s) 220 and/or 230 are configured to carry a traveling wave (e.g. a microwave or RF electrode signal) that modulates the optical signal carried by waveguide 210 via the electro-optic effect. For example, the electrode signals may provide electro-optic modulation up to frequencies of 100 GHz, 200 GHz, 500 GHZ or higher. In some embodiments, modulator 201 may provide modulation from at or near DC to frequencies of 100 GHz, 200 GHz, 500 GHz, or more. The modulation may also have a wide window, for example an operation bandwidth of at least 20 GHz. Electrode signals carried by electrodes 220, 230, and 240 may be configured in a variety of manners. For example, electrode 220 may carry a microwave signal, while electrodes 230 and 240 are ground. Other configurations (including but not limited to another number of electrodes) are possible.

Electrodes 220, 230, and/or 240 may include extensions. Embodiments of analogous electrodes may be found in co-pending U.S. patent application Ser. No. 17/843,906, entitled ELECTRO-OPTIC DEVICES HAVING ENGINEERED ELECTRODES, which is a continuation of U.S. patent application Ser. No. 17/102,047 entitled ELECTRO-OPTIC DEVICES HAVING ENGINEERED ELECTRODES, filed Nov. 23, 2020, which claims priority to U.S. Provisional Patent Application No. 62/941,139 entitled THIN-FILM ELECTRO-OPTIC MODULATORS filed Nov. 27, 2019, U.S. Provisional Patent Application No. 63/033,666 entitled HIGH PERFORMANCE OPTICAL MODULATORS filed Jun. 2, 2020, and U.S. Provisional Patent Application No. 63/112,867 entitled BREAKING VOLTAGE-BANDWIDTH LIMIT IN INTEGRATED LITHIUM NIOBATE MODULATORS USING MICRO-STRUCTURED ELECTRODES filed Nov. 12, 2020, all of which are incorporated herein by reference for all purposes. In other embodiments, extensions may be omitted from some or all of electrodes 220, 230, and/or 240. Electrodes 220, 230, and 240 may carry differential electrical signals, a single electrical signal (e.g. a signal and ground), or other signal(s).

Electrode 230 includes a channel region 232 and extensions 234 (of which only one is labeled in FIG. 2B). In some embodiments, extensions 234 may be omitted from ground electrode 230. Similarly, electrode 220 includes channel region 222 and extensions 224 (of which only one is labeled in FIG. 2B). Extensions 224 are shown on only one side of electrode 220 in FIG. 2B. In some embodiments, electrode 220 has extensions on both sides (i.e. proximate to both arms of waveguide 210 in modulator region 249). In some embodiments, extensions 224 or 234 may be omitted from electrode 220 or electrode 230, respectively. Extensions 224 and 234 may be closer to ridge 212 than channel region 222 and 232, respectively, are. For example, the distance s from extensions 224 and 234 to waveguide ridge 212 is less than the distance w from channels 222 and 232 to waveguide ridge 212. Extensions 224 may be closer to electrode 230 (e.g. extensions 234 and/or channel 232) than channel 222 is. Similarly, extensions 234 may be closer to electrode 220 e.g. extensions 224 and/or channel 222) than channel 232 is.

Extensions 224 and 234 are in proximity to ridge 212. For example, extensions 224 and 234 are a vertical distance, d from slab 214 of TFLC waveguide 210. The vertical distance to TFLC waveguide 210 may depend upon the cladding 248 used. The distance d is highly customizable in some cases. For example, d may range from zero (or less if electrodes 220 and 230 contact or are embedded in slab portion 214) to greater than the height of ridge 212. In embodiments in which slab 214 terminates closer to ridge 212 than channel regions 222 and 232, d may be zero (same level as the top surface of slab 214), positive (further from substrate 202 than the top surface of slab 214), or negative (further from substrate 202 than the top surface of slab 214). However, d is generally still desired to be sufficiently small that electrodes 220 and 230 can apply the desired electric field to ridge 212. Extensions 224 and 234 are also a distance, s, from ridge 212. In some embodiments, s<0 (i.e., extensions 224 and/or 234 may extend over the top of ridge 212 or below waveguide 210). Extensions 224 and 234 are desired to be sufficiently close to TFLC waveguide 210 (e.g. close to ridge 212) that the desired electric field and index of refraction change can be achieved. However, extensions 224 and 234 are desired to be sufficiently far from TFLC waveguide 210 (e.g. from ridge 212) that their presence does not result in undue optical losses. Although shown next to ridge 212, extensions 224 and/or 234 may extend above and/or below ridge 212.

In the embodiment shown, extensions 224 have a connecting portion 224A and a retrograde portion 224B. Retrograde portion 224B is so named because a part of retrograde portion may be antiparallel to the direction of signal transmission through electrode 220. Similarly, extensions 234 have a connecting portion 234A and a retrograde portion 234B. Thus, extensions 224 and 234 have a "T"-shape. In some embodiments, other shapes are possible. For example, extensions 224 and/or 234 may have an "L"-shape, may omit the retrograde portion, may be rectangular, trapezoidal, parallelogram-shaped, may partially or fully wrap around a portion of ridge 212, and/or have another shape. Similarly, channel regions 222 and/or 232, which are shown as having a rectangular cross-section, may have another shape. Further, extensions 224 and/or 234 may be different sizes. Although all extensions 224 and 234 are shown as the same distance from ridge 212, some of extensions 224 and/or some of extensions 234 may be different distances from ridge 212. Channel regions 222 and/or 232 may also have a varying size.

Also indicated in FIG. 2B is thickness, t, of extensions 224 and 234. In the embodiment shown, channels 222 and 232 have the same thickness. In some embodiments, the thickness of extensions 224 and/or 234 may vary. For example, extensions 224 may be thinner (or thicker) than extensions 234. Further, different extensions 224 may have different thicknesses. Similarly, different extensions 234 may have different thicknesses. Extensions 224 and/or 234 may also have a different thickness than channels 222 and/or 232. For example, extensions 224 and/or 234 may be thinner (or thicker) than channels 222 and/or 232. Different portions of extensions 224 and/or 234 may also have different thicknesses. For example, retrograde portions 224B and/or 234B may be thinner (or thicker) than connecting portions 224A and/or 234B. Thus, TFLC PICs 200 and 100 may have a variety of configurations, components, and functions. Performance of TFLC PICs 200 and 100 may be superior to that of other, non-TFLC PICs.

Photonics device 200 also includes balun 250 shown in FIG. 2A. For clarity, extensions 224 and 234 are not shown in FIG. 2A. Balun 250 includes inputs 252 and 254 and outputs 260 and 262. In the embodiment shown, balun 250 receives a differential signal (S and S') and provides a single-ended signal to optical device 201. In particular, balun 250 provides one input differential signal, S, to signal electrode 220 via output 260. Balun 250 also splits the other differential signal, S', between ground electrodes 230 and 240. In some embodiments, ground electrodes 230 and 240 are symmetrically distributed around the signal electrode 220. In some embodiments, second output 262 divides a current for the negative signal S' evenly between ground electrodes 230 and 240. For example, half of the current of the signal S' (e.g. to within twenty percent, within ten percent, within five percent, or within one percent) may be provided to each electrode 230 and 240. For another number of ground electrodes, balun 250 may symmetrically (e.g., evenly) divide the signal S' between the connected ground electrodes. In addition, each ground electrode 230 and 240 may be wider than signal electrode 220. For example, each ground electrode 230 and 240 may have a width, $w_g$, that is at least 1.5 multiplied by the width, $w_s$, of signal electrode 220, at least twice the width of signal electrode 220, at least three multiplied by the width of signal electrode 220, at least five multiplied by the width of signal electrode 220, or at least ten multiplied by the width of signal electrode 220. In some embodiments, the width of a ground electrode 230 and/or 240 may be not more than twenty multiplied by the width of signal electrode 220. In some embodiments, ground electrodes 230 and 240 have the same width (e.g. to within one percent, five percent, or ten percent). In other embodiments, ground electrodes 230 and 240 may have different widths.

Photonics device 200 may share the benefits of photonics device 100A. Thus, the advantages of differential drivers 106/differential driving signals may be combined with the benefits of TFLC electro-optic materials in a single-ended modulator configuration. For example, improved linearity, high speed communications (e.g. 40 Gbaud or higher), a large electro-optic effect, and low optical and/or microwave losses may be achieved without suffering a significant reduction in bandwidth or increase in voltage swing that might be present if TFLC optical device 201 is a TFLC differential modulator. For example, in some embodiments, photonics device 200 may operate from at or near DC up to at least 10 GHz, at least 20 GHz, at least 50 GHz, at least 100 GHz, at least 200 GHz, or at least 500 GHz.

The use of balun 250 in driving TFLC optical device 201 may also avoid significant drawbacks generally be associated with devices such as balun 250. For example, baluns often generate parasitic modes. Such modes may result in issues such as loss reflections, chirp and large crosstalk. Thus, such devices may be deemed inappropriate for use with optical devices such as TFLC optical device 201. Moreover, a balun may generally have a narrower band that does not reach DC or near DC (e.g. less than 1 MHz). Consequently, such devices may not be usable in applications such as high speed communication.

However, it has been determined that appropriate configuration of balun 250, and thus, balun 150, may sufficiently mitigate these issues. This may be understood as follows. Balun 250 provides positive signal S to signal electrode 220 and negative signal S' to ground electrodes 230 and 240. The negative differential signal S' may be split symmetrically between the ground electrodes 230 and 240. Thus, S' is provided to ground via symmetric paths. Consequently, parasitic modes may not be excited by balun 250. The corresponding issues due to parasitic modes, such as unwanted chirp and crosstalk, may be mitigated or avoided. Instead, the desired mode may be excited in signal electrode 220. In addition, ground electrodes 230 and 240 may be wide in comparison to signal electrode 220. Consequently, the negative differential S' split between ground electrodes 230 and 240 may be less likely to generate a large voltage swing in ground electrodes 230 and 240. Again, the desired single-ended signal may be more likely to be generated in signal electrode 220. Consequently, performance issues that might otherwise preclude the use of balun 250 in photonics device 200 may be reduced or eliminated. A differential signal applied to balun inputs 252 and 254 may be used to provide a single-ended signal for driving signal electrode. As a result, performance of photonics device 200 may be improved.

Figure 3A:
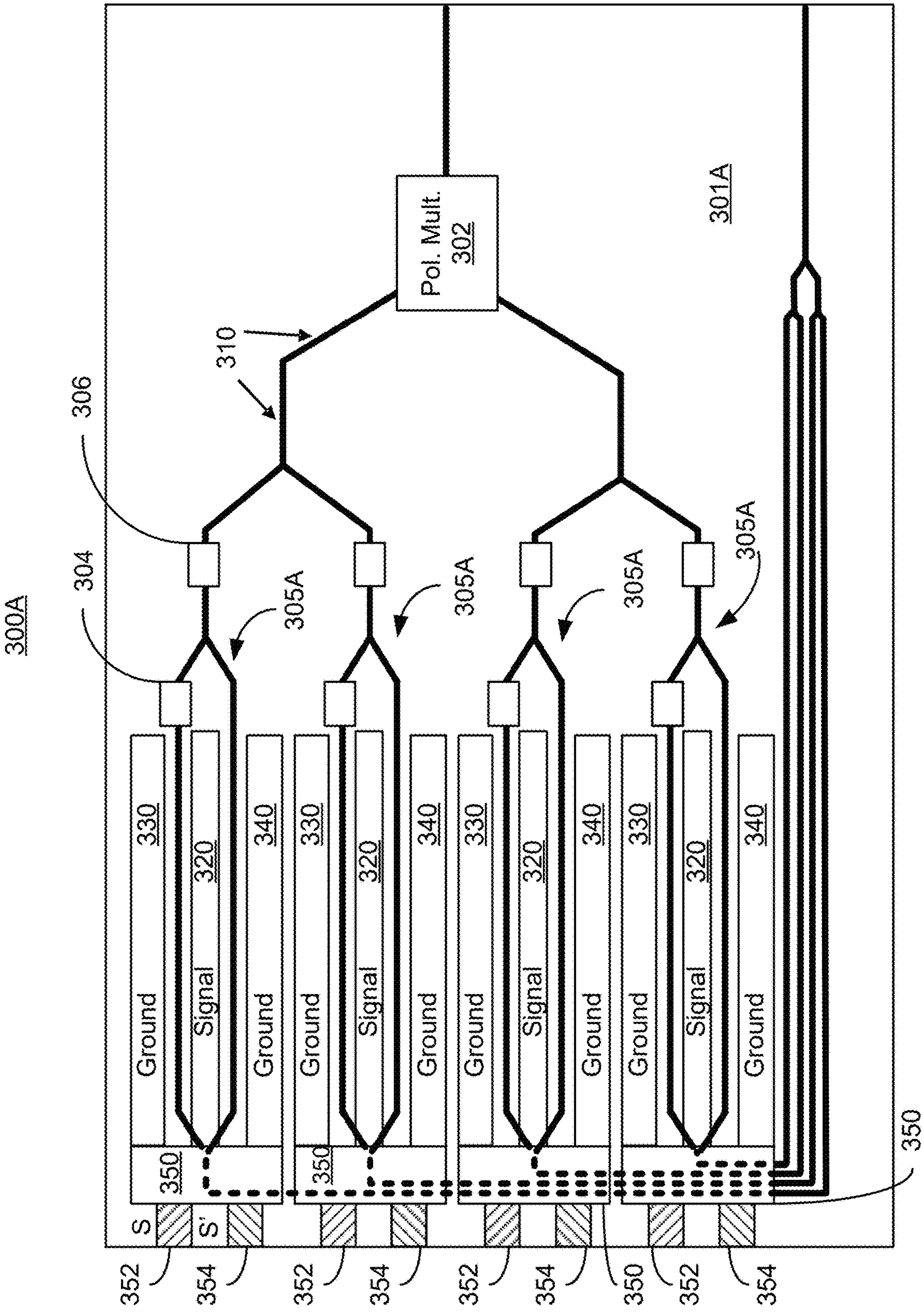
FIGS. 3A-3B depict embodiments of a portion of photonics devices including a thin film lithium-containing optical device and a balun.
Figure 3B:
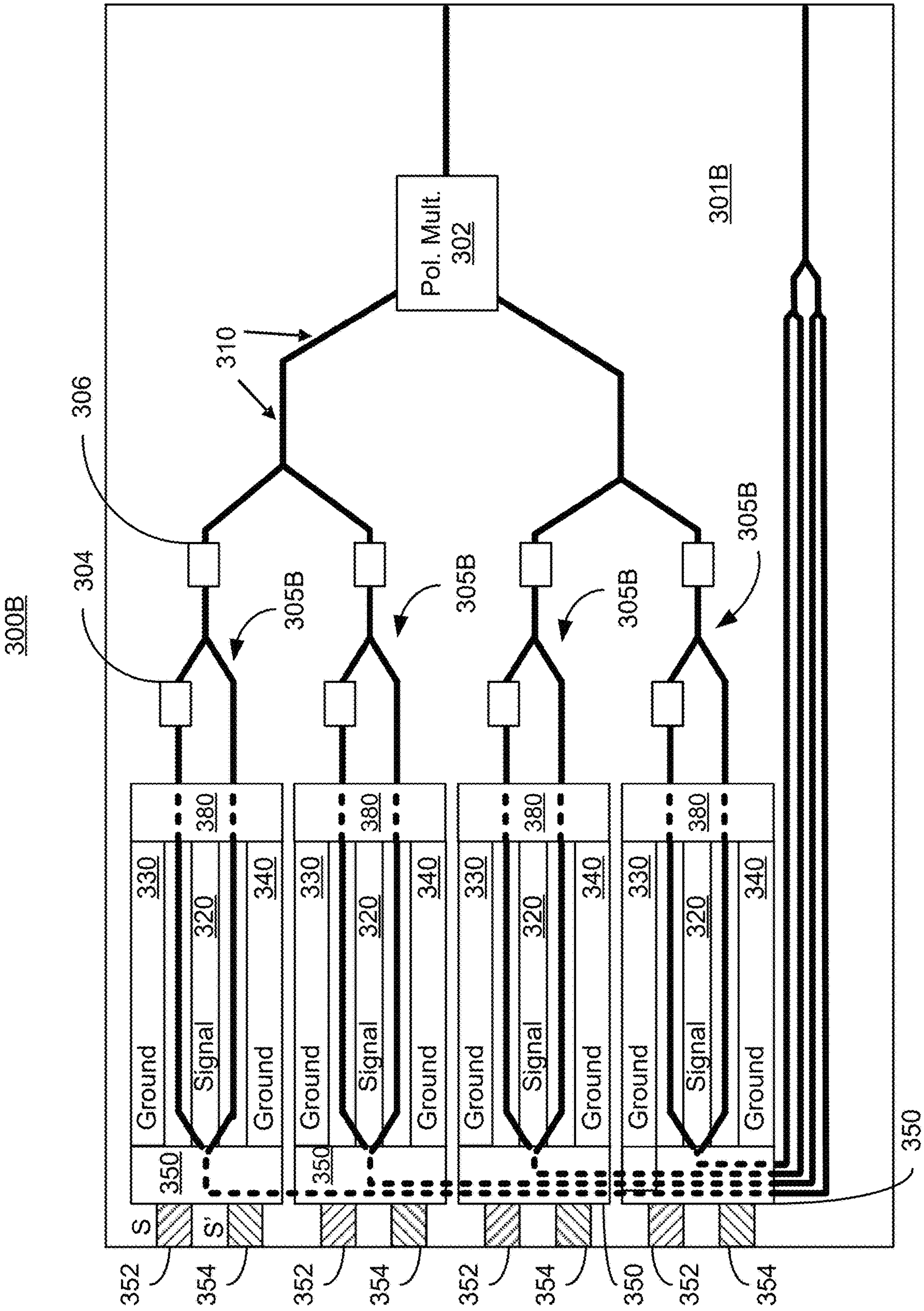

FIGS. 3A-3B depict embodiments of a portion of photonics devices 300A and 300B including thin film lithium-containing optical devices 301A and 301B and baluns 350. FIGS. 3A-3B are not to scale. Only a portion of photonics devices 300A and 300B are shown. Photonics devices 300A and 300B may include other and/or additional structures that are not shown for simplicity. Further, although particular configurations are shown, other configurations are possible. In the embodiment shown, balun 350 is integrated with optical devices 301A and 301B (e.g., on the same PIC). In some embodiments, baluns 350 may be located elsewhere, for example as shown in photonics devices 100B, 100C, 100D, and 100E.

Referring to FIG. 3A, photonics device 300A includes waveguides 310 forming multiple channels (i.e., multiple optical modulators 305A) as well as polarization multiplexer 302 and phase shifters 304 and 306, of which only two are labeled. For example, phase shifters 304 and/or 306 may be heaters configured to provide a substantially constant (DC) phase shift. Phase shifters 304 and/or 305 maybe utilize thermo-optic effects, electro-optic effects, or a combination of both. Phase shifters 304 and/or 305 may also provide a varying shift in some embodiments. In some embodiments, for example, phase shifters 304 and/or 306 may be resistors through which the appropriate current for a desired phase shift is driven. Waveguides 310 may be TFLC waveguides (and/or contain other Pockels effect materials) and are analogous to waveguides 110 and 210.

Each optical modulator 305A includes a portion of waveguides 310, signal electrode 320 and ground electrodes 330 and 340 that are analogous to waveguides 110 and 210, signal electrodes 120 and 220, and ground electrodes 230 and 240. Photonics device 300A includes balun 350 having inputs 352 and 354 for each optical modulator 305A. The paths of waveguides 110 proximate to baluns 350 are shown by dotted lines. Baluns 350 are analogous to baluns 150 and 250. Thus, balun 350 is provided with a differential signal (S and S') via inputs 352 and 354. Balun 350 provides a single ended signal to signal electrode 320. In some embodiments, balun 350 is configured in an analogous manner to balun

250. Thus, photonics device 300A may be considered to have on-chip baluns 350 as part of its electronic transmission lines. Baluns 350 and may be fabricated on a common substrate with the modulators 305A, (i.e. not die transferred, bonded, or on a different substrate). In some embodiments, the transmission lines may include an open-collector-driver (not shown) on another integrated circuit. Such a driver may be wire bonded or flip-chip on to the PIC for TFLC optical device 301A. The transmission lines may also be regular transmission lines supporting a voltage signal propagating from the input to termination.

In photonics device 300A, modulators 305A may be in a dual polarization in-phase quadrature (DPIQ) configuration. Thus, phase shifters 304 and 306 provide tuning sections (e.g. DC or fine tuning) for each modulator 305A. Optical waveguides 310 may have multi-mode-interferometers (MMIs) to support the splitting and combining of optical waveguides 310 to form a fully functioning DPIQ modulator. Multiple modulators 305A may be on the same chip/substrate. The DPIQ modulators may contain multiple monitor ports in the auxiliary ports of MMIs or as taps from the waveguides. Although waveguides 310 in modulators 305A are shown as straight, in some embodiments, waveguides 310 and modulators 305A may include bends, for example, U-shaped and/or S-shaped bends. This may extend the length of the modulation region and aid in supporting a low drive voltage. Connection to a DSP (e.g. DSP 104) and/or a driver may be made through wire bonding or flip-chip or electrical via connections in advanced packaging process. Other connection techniques may also be used.

FIG. 3B depicts photonics device 300B that is analogous to photonics device 300A. Photonics device 300B includes optical device 301B having waveguides 310 and modulators 305B that are analogous to optical device 301A, waveguides 310 and modulators 305A. Thus, photonics device 300B includes signal electrode 320 and ground electrodes 330 and 340 that are analogous to signal electrodes 120 and 220, and ground electrodes 230 and 240. Also include are baluns 350 and inputs 352 and 354 that are analogous to baluns 350 and inputs 352 and 354 of photonics device 300A.

In addition, photonics device 350B includes on-chip termination networks 380. Baluns 350 and termination network 380 may be fabricated on a common substrate with modulators 305B (i.e. not die transferred or bonded, or on a different substrate), For example, such termination networks might be or include a resistor.

DPIQ photonics devices 300A and 300B share the benefits of photonics devices 100A, 100B, 100C, 100D, 100E, and/or 200. Thus, the advantages of differential drivers and differential driving signals may be combined with the benefits of TFLC electro-optic materials in a single-ended modulator configuration. For example, improved linearity, high speed communications, a large electro-optic effect, and low optical and/or microwave losses may be achieved without suffering a significant reduction in bandwidth or increase in voltage swing that might be present if TFLC optical device 301A or 301B is a differential modulator.

Figure 4A:
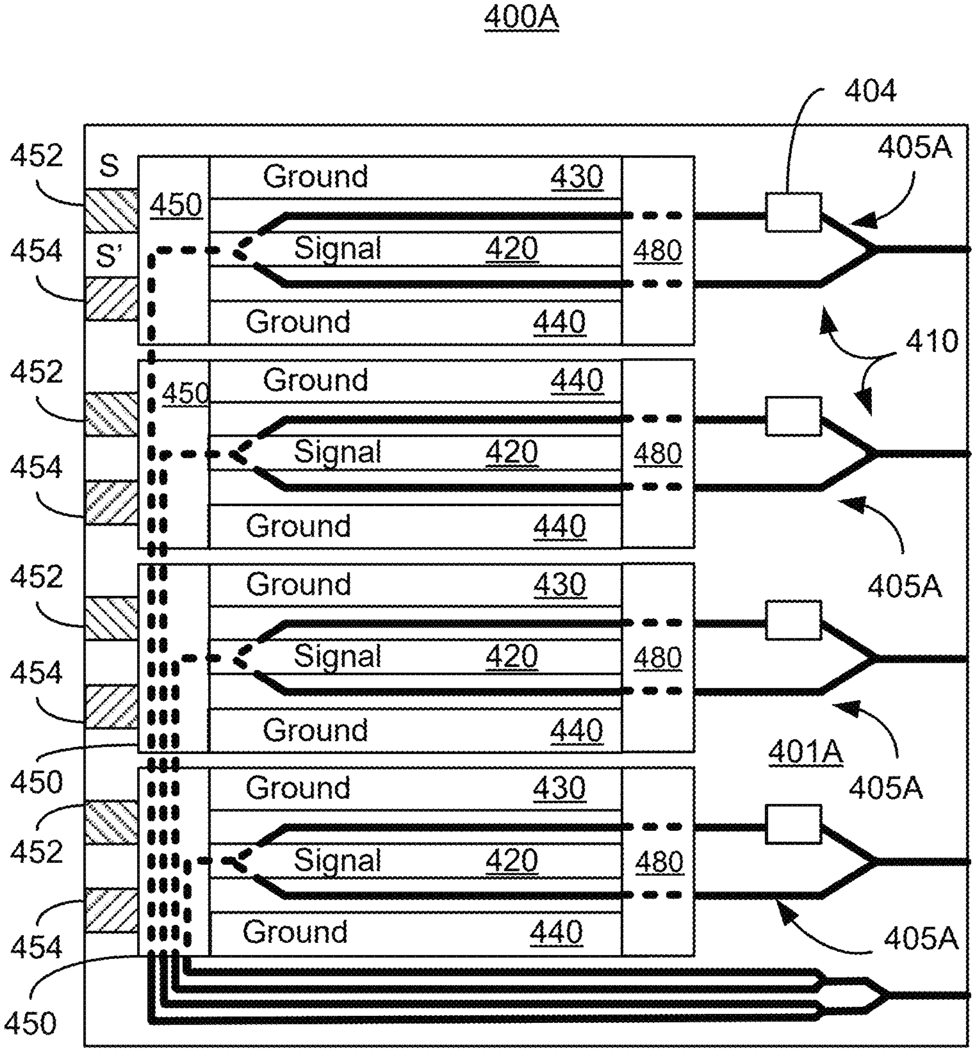
FIGS. 4A-4B depict embodiments of a portion of photonics devices including a thin film lithium-containing optical device and a balun.
Figure 4B:
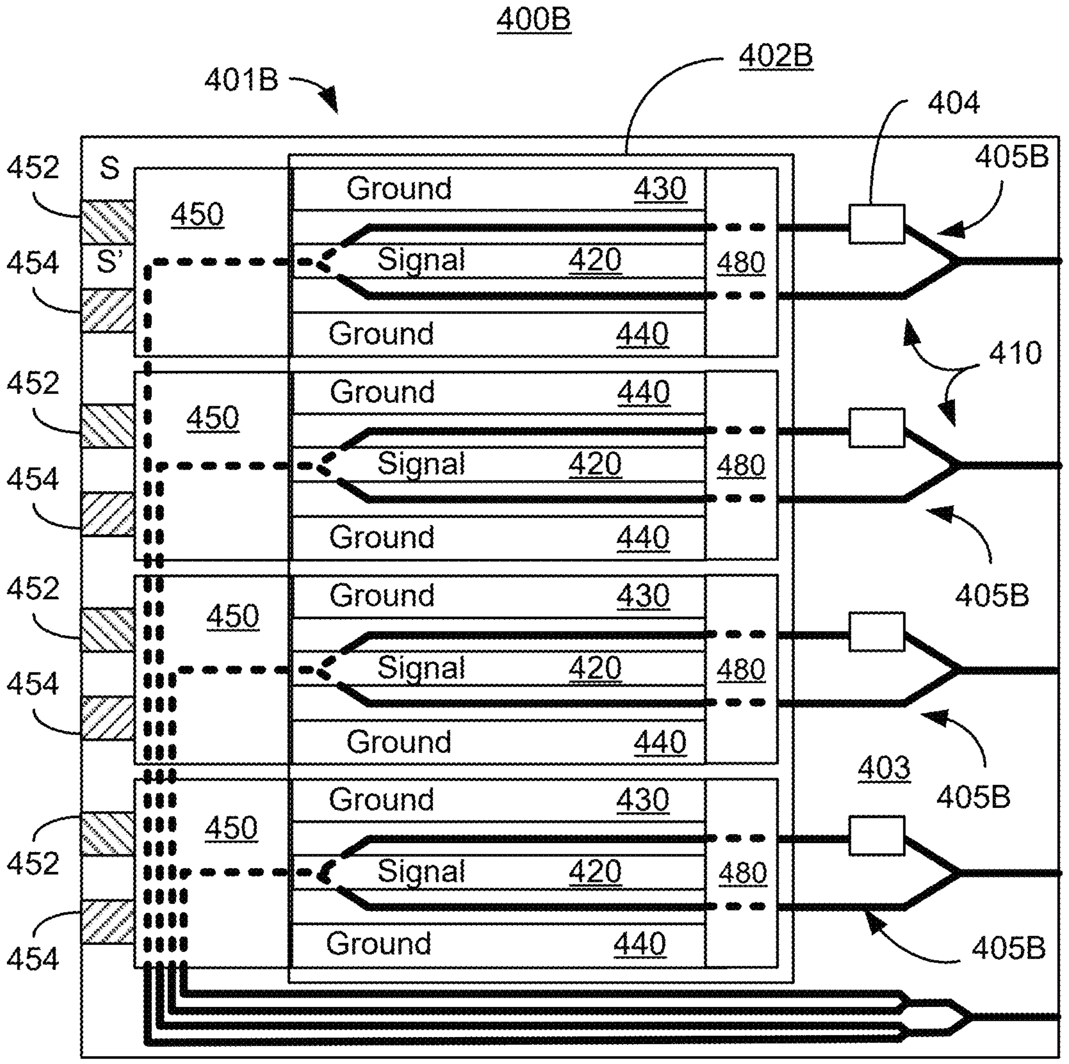

FIGS. 4A-4B depict embodiments of a portion of photonics devices 400A and 400B including thin film lithium-containing optical devices 401A and 401B and baluns 450. FIGS. 4A-4B are not to scale. Only a portion of photonics devices 400A and 400B are shown. Photonics devices 400A and 400B may include other and/or additional structures that are not shown for simplicity. Further, although particular configurations are shown, other configurations are possible. Photonics device 400A includes optical device 401A, waveguides 410 forming multiple channels (i.e. multiple optical modulators 405A) as well as phase shifters 404 and termination network 480 that are analogous to photonics device 300A, waveguides 310, optical modulators 305A, phase shifters 304, and termination network 380, respectively. Similarly, photonics device 400B includes optical device 401B, waveguides 410 forming multiple channels (i.e. multiple optical modulators 405B) as well as phase shifters 404 and termination network 480 that are analogous to photonics device 300B, waveguides 310, optical modulators 305B, phase shifters 304, and termination network 380, respectively. Signal electrodes 420 and ground electrodes 430 and 440 are analogous to signal electrodes 120 and 220, and ground electrodes 230 and 240.

Optical modulators 405A and 405B may be configured in an intensity-modulate-direct-detection (IMDD) configuration. Thus, phase shifters 404 provide tuning sections (e.g., DC or fine tuning) for each modulator 405A and 405B. Optical waveguides 410 may have MMIs to support the splitting and combining of optical waveguides to form a fully functioning IMDD modulators. Multiple IMDD modulators may be on the same chip/substrate (e.g. as shown in FIGS. 4A and 4B). The IMDD modulators may contain multiple monitor ports in the auxiliary ports of MMIs or as taps from the waveguides. The IMDD modulators may have on-chip wavelength division multiplexing components to combine different wavelength carriers. Although waveguides 410 in modulators 405A and 405B are shown as straight, in some embodiments, waveguides 410 and modulators 405A and 405B may include bends, for example, U-shaped and/or S-shaped bends. This may extend the length of the modulation region and aid in supporting a low drive voltage. Connection to a DSP (e.g. DSP 104) and/or a driver may be made through wire bonding or flip-chip or electrical via connections in advanced packaging process. Other connection techniques may also be used. In some embodiments, the pitch between the differential pairs 452 and may be less than or equal to 1 mm, 625 micrometers, 500 micrometers, 255 micrometers, 250 micrometers, or 127 micrometers.

In some embodiments, baluns 450 may be integrated into the same PIC as optical device 401A, as indicated in photonics device 400A of FIG. 4A. In some embodiments, optical device 401B may be integrated on a substrate 403 with a different material (e.g. silicon photonics), as shown in FIG. 4B. In some such embodiments, electrodes 420, 430, and 440 may be on a different vertical layer than the differential inputs 452 and 454. For example, electrodes 420, 430, and 440 may be closer to TFLN/LT layer of waveguides 410, while differential inputs 452 and 454 may be close to silicon photonics substrate layer 403. In such embodiments, balun 450 may both connect the electrodes vertically and achieve the voltage conversion at the same time. This architecture may also be used for other modulators such as DPIQ modulators.

IMDD photonics devices 400A and 400B share the benefits of photonics devices 100A, 100B, 100C, 100D, 100E, and/or 200. Thus, the advantages of differential drivers and differential driving signals may be combined with the benefits of TFLC electro-optic materials in a single-ended modulator configuration. For example, improved linearity, high speed communications, a large electro-optic effect, and low optical and/or microwave losses may be achieved without suffering a significant reduction in bandwidth or increase in voltage swing that might be present if TFLC optical device 401A or 401B is a differential modulator.

Figure 5:
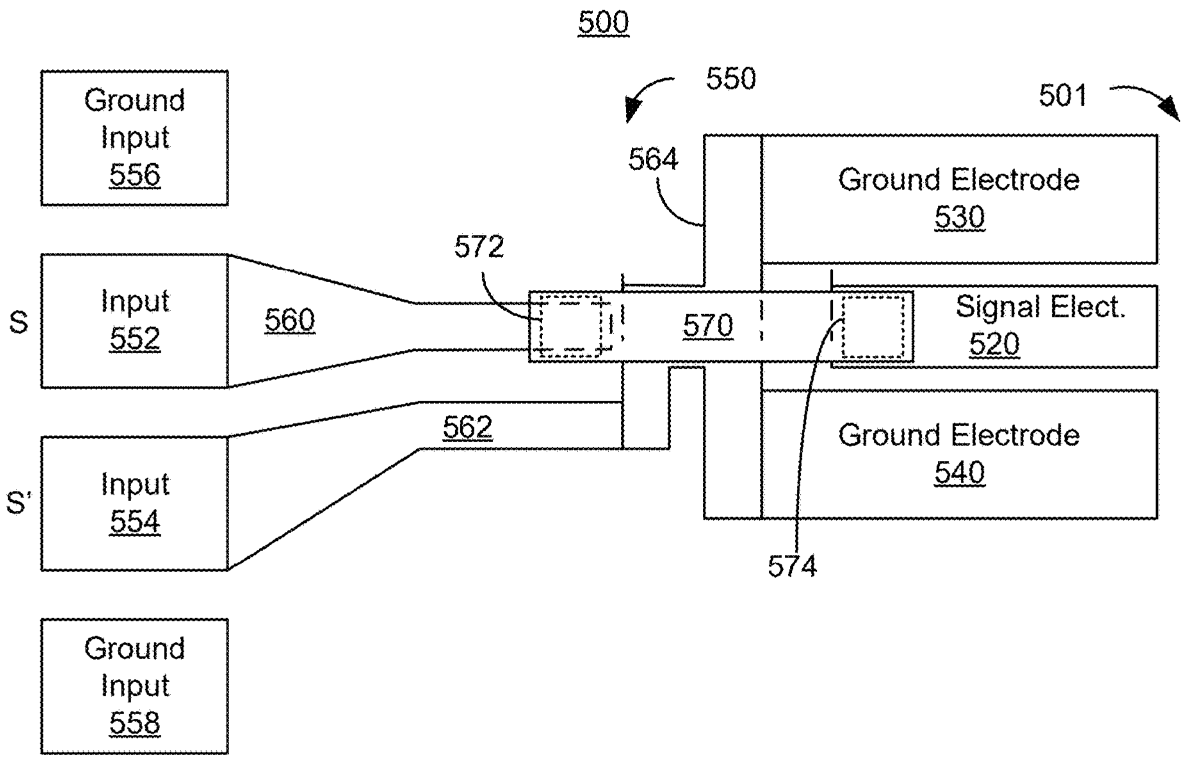
FIG. 5 depicts an embodiment of a portion of a photonics device including a thin film lithium-containing optical device and a balun.

FIG. 5 depicts an embodiment of a portion of a photonics device 500 including thin film lithium-containing optical device 501 and balun 550. FIG. 5 is not to scale. Only a portion of photonics device 500 (i.e., primarily balun 550) is shown. Photonics device 500 may include other and/or additional structures that are not shown for simplicity. Further, although particular configurations are shown, other configurations are possible. For simplicity, only electrical connections are shown. Optical device 501 to which balun 550 is connected may be a modulator and includes a signal electrode and ground electrodes to which signal electrode 520 and ground electrodes 530 and 540 are coupled. Signal electrode 520 and ground electrodes 530 and 540 may thus be considered analogous to or the same as signal electrode 220 and ground electrodes 230 and 240. Thus, waveguide arms (not shown) may be between electrodes 520 and 530 and electrodes 520 and 540.

Balun 550 includes inputs 552 and 554 (e.g. conductive lines or pads) and conductive lines 560 and 562 (also termed traces) analogous to inputs 252 and 254 and lines 260 and 262. Balun 550 also includes ground inputs 556 and 558. Balun also includes conductive line (or trace) 564 that is coupled with conductive line 562 and ground electrodes 530 and 540. Thus, ground electrodes 530 and 540 are coupled to input 554 receiving negative differential signal S'. Similarly, line 560 is connected with signal electrode 520 through conductive vias 572 and 574 and conductive bridge 570. In some embodiments, bridge 570 is, therefore, on a different level (i.e. is a different metallization layer), than some or all of the remaining electrical components shown. The electrodes (not shown) for optical device 501 may, but need not, be coplanar with electrodes 520, 530, and 540, lines 560, 562, and 564, and inputs 552, 554, 556, and 558.

In some embodiments, balun 550 may provide an approximately 0/2/0 V Ground-Signal-Ground (GSG) (e.g. single-ended) signal to signal electrode 520 (and thus to the signal electrode of optical device 501) from a +1/−1V (Ground-Signal-Signal'-Ground, or GSS'G) differential signal provided to inputs 556, 552, 554, and 558. Balun 550 achieves this signal in optical device 501 without the use of active components. In some embodiments, the balun may be considered to provide a single-ended signal (GSG) with a voltage swing of 2V on signal electrode 520 in optical modulator 501 from a differential signal (GSS'G) where each of the two signal lines coupled with inputs 552 and 554 carries a voltage swing of 1V (resulting in a differential voltage swing of 2V) without the use of active components. Thus, the magnitude of the voltage swing (e.g. 2 V) may be maintained using the width and/or symmetry of the ground electrodes 530 and 540. The wide ground electrodes 530 and 540 may be considered to allow continuity of current through the electrodes while suppressing the voltage swing in ground electrodes 530 and 540. Further, undesirable parasitic modes may be suppressed or avoided by evenly splitting the current in ground electrodes 530 and 540.

By symmetrically connecting the S' input signal on input 554/output 562 to grounds 530 and 540, the current is split (substantially) equally between ground electrodes 530 and 540. Consequently, the differential input mode can be almost fully converted into the desired single-ended mode while reducing or eliminating the parasitic slot line mode. Thus, balun 550 may convert a high frequency+1/−1V signal at the inputs 553, 554, 556, and 558 into a 0/2/0V GSG signal in signal electrode 520, assuming balun 550 has no insertion loss and the characteristic impedances of the two transmission lines are matched.

If balun 550 is used on the PIC including optical modulator 501, the GSSG differential inputs 552, 554, 556, and 558 may be coupled to wire bond pads (which may have a typical size of 50-500 micrometer). The single ended electrodes 520, 530, and 540 could be connected to or part of a single-ended optical modulator.

In balun 550, lines 560 and 562 are tapered and cross using conductive bridge 570. The characteristics of the tapering and crossing of lines of balun 550 may be configured to optimize the desired performance metrics. In some embodiments, traces 560 and 562 are tapered down to a width of less than thirty micrometers. Such a tapering may reduce the impact of capacitive parasitics in the region in which lines 560, 562, 564, and 570 overlap. In some embodiments, the taper and crossing region (e.g. lines 560, 562, 564, and 570) may typically be quite short. For example, the taper on traces 560 and 562 may be less than one millimeter long. The crossing region may be less than 100 micrometers. In some embodiments, tapering of lines 560 and 562 may be adiabatic. However, in some embodiments, tapering of electrodes 560 and 562 may not be adiabatic).

In the embodiment shown, ground input traces 556 and 558 are terminated. Thus, ground inputs are not coupled to optical device 501. In some embodiments, inputs 556 and 558 may also be tapered to improve return loss.

Balun 550 may be considered a 1:1 balun design. As such, it may be desired to match the differential impedance of the differential transmission line coupled to inputs 552 and 554 to the single ended impedance of optical device 501. For example, the differential driver and transmission line might have an impedance of 50-70 ohms, while the single-ended modulator 501 might have an impedance of 40-60 ohms. This is in contrast to the native/non-engineered case where the single-ended impedance is on the order of one-half of the differential impedance. In some embodiments, optical modulator 501 (indicated but not generally shown) has inputs of +V and −V (or has a differential input with amplitude of V). Other configurations are possible.

Photonics device 500 shares the benefits of photonics devices 100A, 100B, 100C, 100D, 100E, and/or 200. Thus, the advantages of differential drivers and differential driving signals may be combined with the benefits of TFLC electro-optic materials in a single-ended modulator configuration. For example, improved linearity, high speed communications, a large electro-optic effect, and low optical and/or microwave losses may be achieved without suffering a significant reduction in bandwidth or increase in voltage swing that might be present if TFLC optical device 501 were a differential modulator.

Figure 6A:
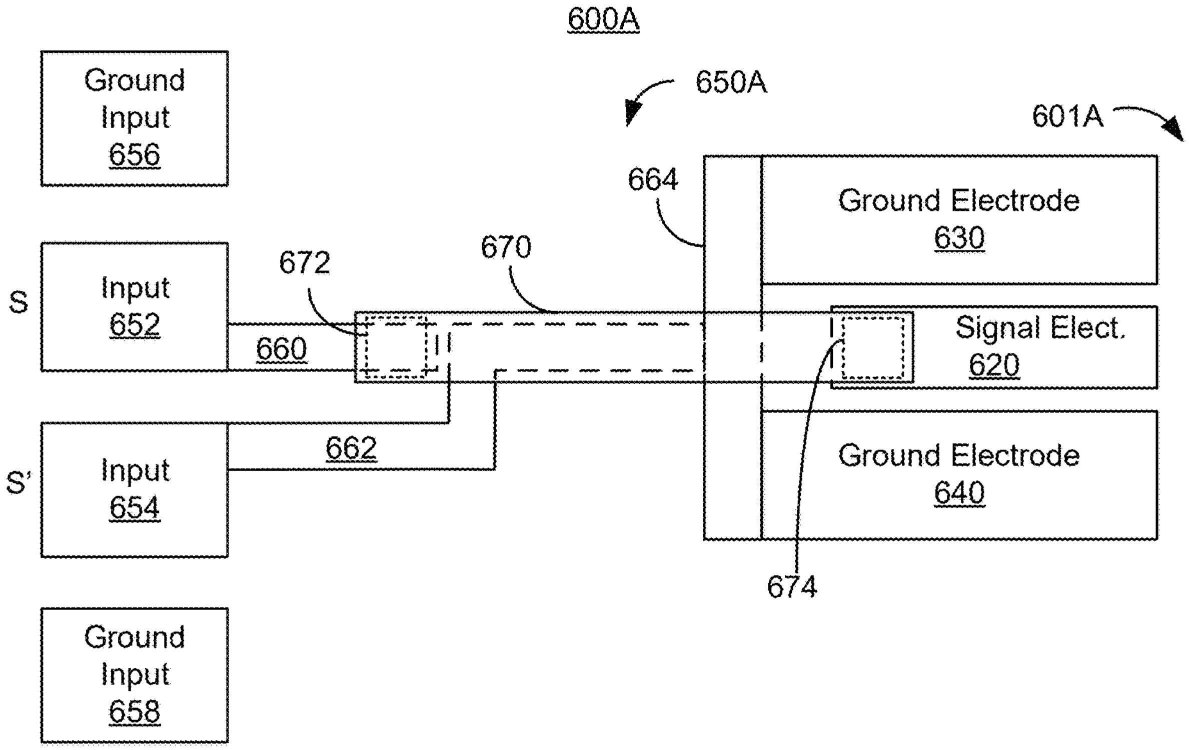
FIGS. 6A-6B depict embodiments of a portion of photonics devices including a thin film lithium-containing optical device and a balun.
Figure 6B:
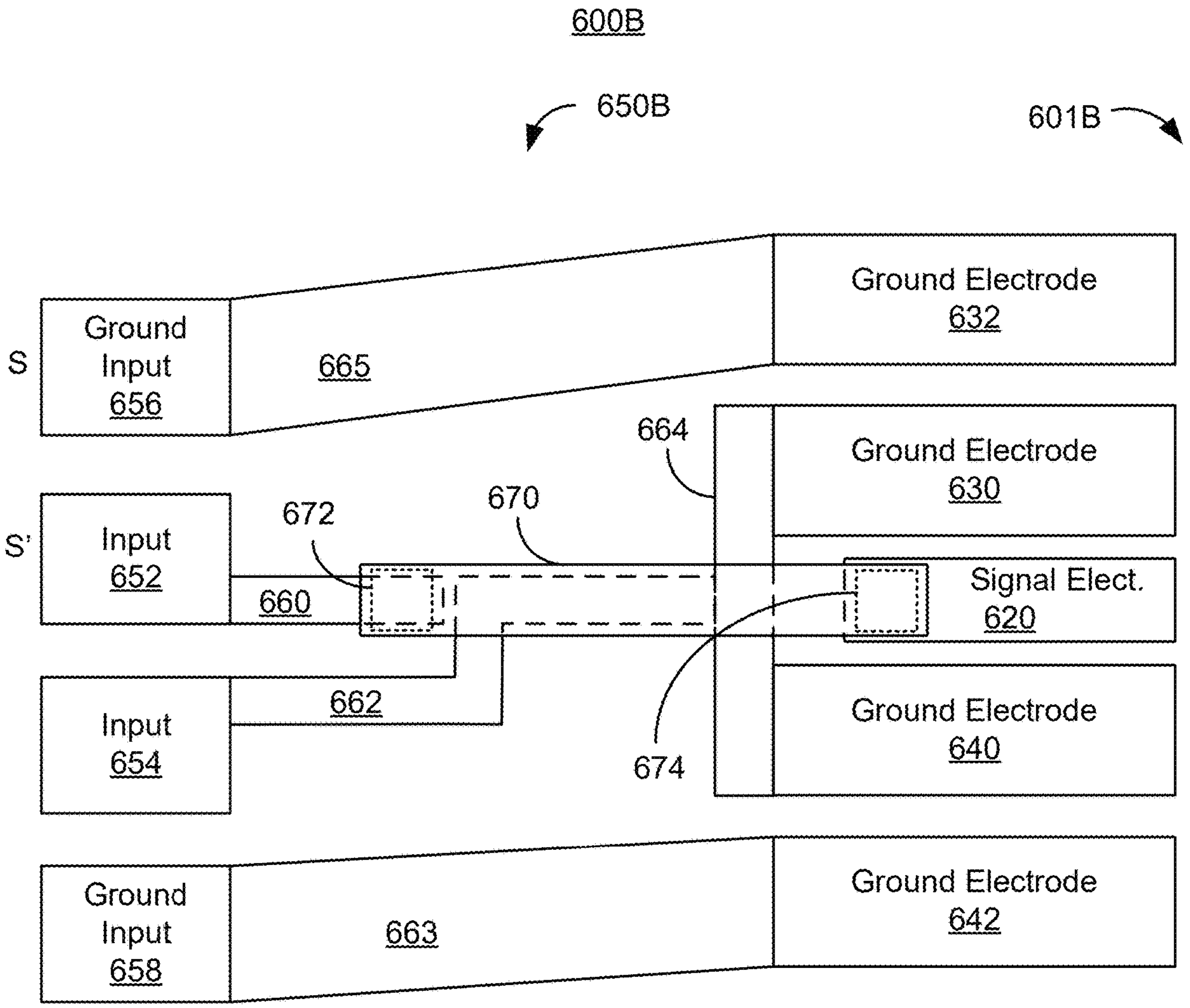

FIGS. 6A-6B depict embodiments of a portion of photonics devices 600A and 600B including TFLC optical devices 601A/601B and baluns 650A/650B. FIGS. 6A-6B are not to scale. Only a portion of photonics devices 600A and 600B (i.e., primarily baluns 650A and 650B) are shown. Photonics devices 600A and/or 600B may include other and/or additional structures that are not shown for simplicity. Further, although particular configurations are shown, other configurations are possible. For simplicity, only electrical connections are shown. Optical devices 601A and 601B to which baluns 650A and 650B are connected may be modulators and include signal electrodes and ground electrodes to which signal electrode 620 and ground electrodes 630 and 640 are coupled. Signal electrode 620 and ground electrodes 630 and 640 may thus be considered analogous to signal electrode 220 and ground electrodes 230 and 240. Thus, waveguide arms (not shown) may be between electrodes 620 and 630 and electrodes 620 and 640.

Baluns 650A and 650B each includes inputs 652 and 654 and lines 660 and 662 analogous to inputs 252 and 254 and lines 260 and 262. Balun 650A and 650B each also includes ground inputs 656 and 658 analogous to ground inputs 556 and 558. Baluns 650A and 650B each also includes line 664 that is coupled with line 662 and ground electrodes 630 and 640, which are analogous to lines 564 and 562 and ground electrodes 530 and 540. Thus, ground electrodes 630 and 640 are coupled to input 654 receiving negative differential signal S'. Similarly, line 660 is connected to signal electrode 620 through conductive bridge 670 and conductive vias 672 and 674. Thus, line 660, conductive bridge 670, and vias 670 and 674 are analogous to line 560, bridge 570, and conducive vias 572 and 574. In some embodiments, bridge 670 is on a different level (i.e. is a different metallization layer), than some or all of the remaining electrical components shown. The electrodes (not shown) for optical device 601 may, but need not, be coplanar with electrodes 620, 630, and 640, lines 660, 662, and 664, and inputs 652, 654, 656, and 658.

For baluns 650A and 650B, trace 662 is routed toward the center, aligned with trace 660. Thus, trace 662 is under conductive bridge 670. Stated differently, coplanar strip line 662 may be aligned with and under coplanar strip line 670. In some embodiments, this configuration of traces 662 and 670 may improve the transmission of the signal mode to the signal electrode 620 of optical devices 601A and 601B. Further, return loss may be reduced to better than 5 dB. In balun 650B, ground inputs 656 and 658 have been extended via lines 665 and 663 and ground electrodes 632 and 642. Thus, additional grounds on optical device 601B might be supported.

Photonics devices 600A and 600B share the benefits of photonics devices 100A, 100B, 100C, 100D, 100E, and/or 200. Thus, the advantages of differential drivers and differential driving signals may be combined with the benefits of TFLC electro-optic materials in a single-ended modulator configuration. For example, improved linearity, high speed communications, a large electro-optic effect, and low optical and/or microwave losses may be achieved without suffering a significant reduction in bandwidth or increase in voltage swing that might be present if TFLC optical device 601 were a differential modulator.

Figure 7:
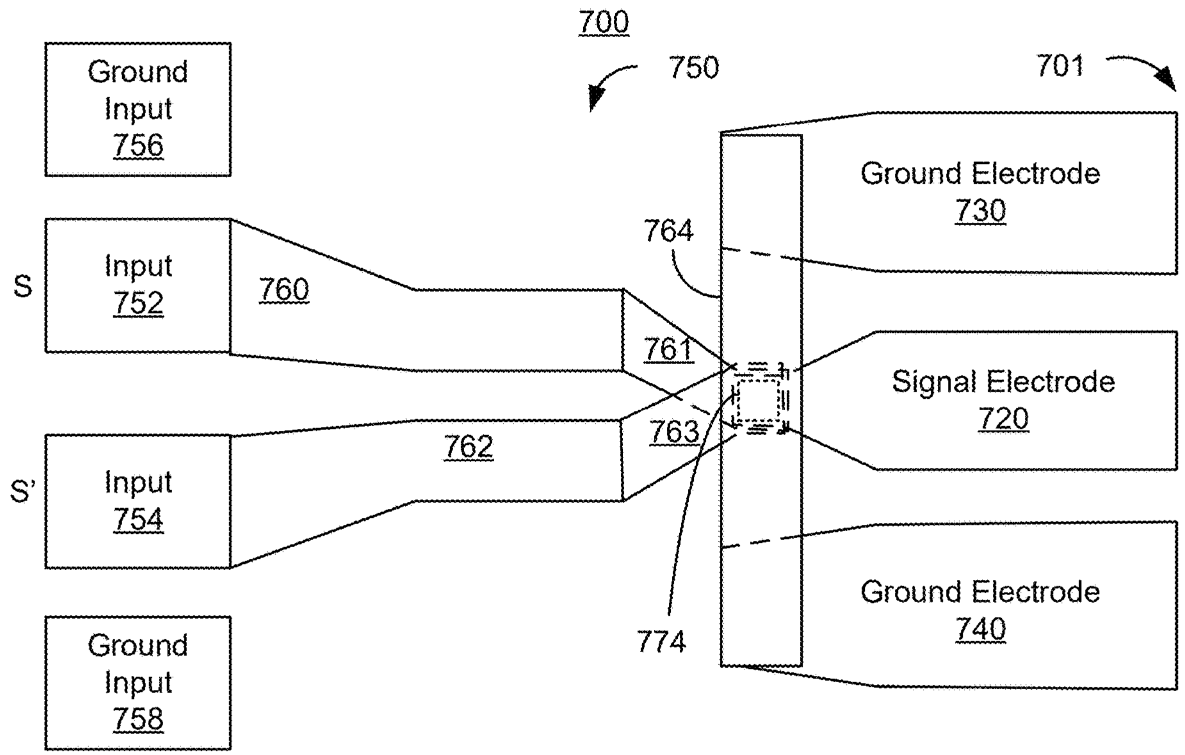
FIG. 7 depicts an embodiment of a portion of a photonics device including a thin film lithium-containing optical device and a balun.

FIG. 7 depicts an embodiment of a portion of a photonics device 700 including thin film lithium-containing optical device 701 and balun 750. FIG. 7 is not to scale. Only a portion of photonics device 700 (i.e., primarily balun 750) is shown. Photonics device 700 may include other and/or additional structures that are not shown for simplicity. Further, although particular configurations are shown, other configurations are possible. For simplicity, only electrical connections are shown. Optical device 701 to which balun 750 is connected may be a modulator and includes a signal electrode and ground electrodes to which signal electrode 720 and ground electrodes 730 and 740 are coupled. Signal electrode 720 and ground electrodes 730 and 740 may thus be considered analogous to or the same as signal electrode 220 and ground electrodes 230 and 240. Thus, waveguide arms (not shown) may be between electrodes 720 and 730 and electrodes 720 and 740.

Balun 750 includes inputs 752 and 754 and lines 760 and 761 and lines 762 and 763 analogous to inputs 252 and 254 and lines 260 and 262. Balun 750 also includes ground inputs 756 and 758. Balun 750 also includes line 764 that is coupled with lines 762 and 763, through conductive via 774. Line 764 is also coupled to ground electrodes 730 and 740. Thus, ground electrodes 730 and 740 are coupled to input 754 receiving negative differential signal S'. Similarly, line 760, and thus input 752 receiving positive differential signal S, are connected with signal electrode 720. The electrodes (not shown) for optical device 701 may, but need not, be coplanar with electrodes 720, 730, and 740, lines 760, 762, and 764, and inputs 752, 754, 756, and 758.

Balun 750 is analogous to balun 650 in that inputs 752 and 754 are centrally routed. Thus, the connections for inputs 752 and 754 may be more symmetric. Similarly, traces 760 and 762 are more symmetrically tapered. This may further reduce or minimize the excitation of parasitic modes. Thus, performance may be further improved.

Photonics device 700 shares the benefits of photonics devices 100A, 100B, 100C, 100D, 100E, and/or 200. Thus, the advantages of differential drivers and differential driving signals may be combined with the benefits of TFLC electro-optic materials in a single-ended modulator configuration. For example, improved linearity, high speed communications, a large electro-optic effect, and low optical and/or microwave losses may be achieved without suffering a significant reduction in bandwidth or increase in voltage swing that might be present if TFLC optical device 701 were a differential modulator.

Figure 8:
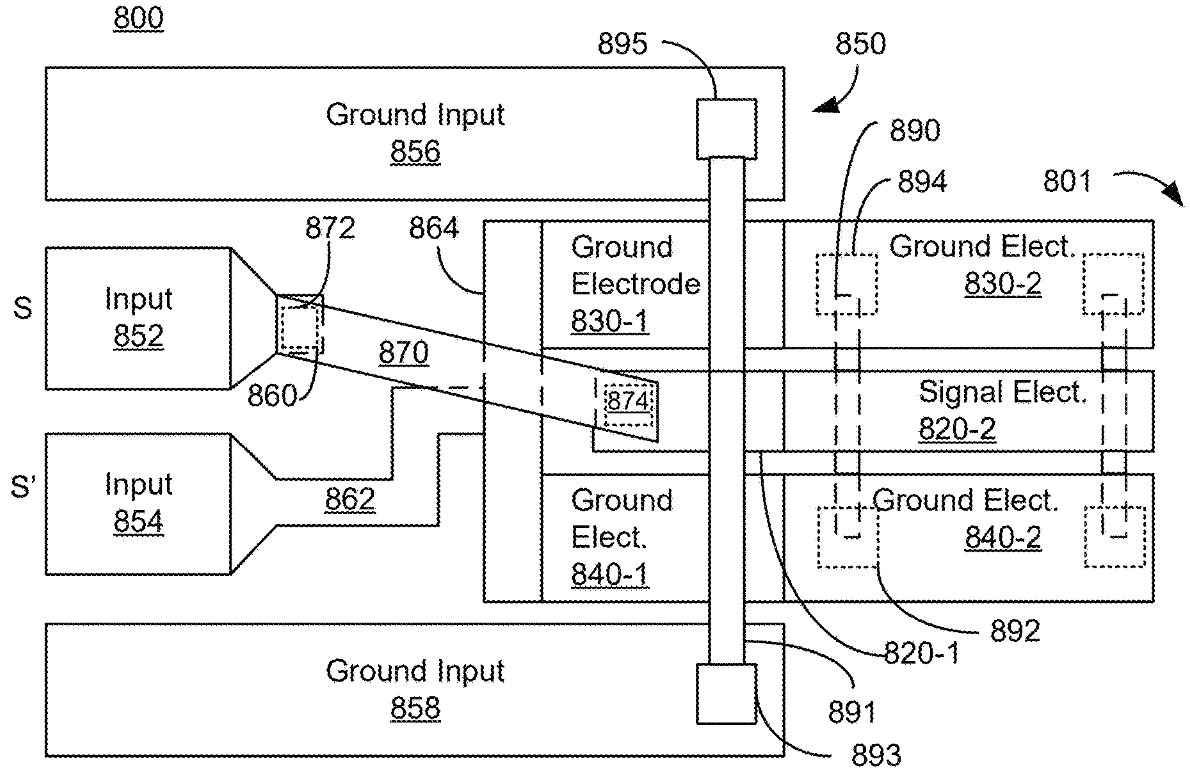
FIG. 8 depicts an embodiment of a portion of a photonics device including a thin film lithium-containing optical device and a balun.

FIG. 8 depicts an embodiment of a portion of a photonics device 800 including thin film lithium-containing optical device 801 and balun 850. FIG. 8 is not to scale. Only a portion of photonics device 800 (i.e., primarily balun 850) is shown. Photonics device 800 may include other and/or additional structures that are not shown for simplicity. Further, although particular configurations are shown, other configurations are possible. For simplicity, only electrical connections are shown. Optical device 801 to which balun 850 is connected may be a modulator and includes a signal electrode and ground electrodes to which signal electrode 820 and ground electrodes 830 and 840 are coupled. Signal electrode 820-1 and 820-2 (collectively or generically 820) and ground electrodes 830-1 and 830-2 (collectively or generically 830) and ground electrodes 840-1 and 840-2 (collectively or generically 84) may thus be considered analogous or the same as to signal electrode 220 and ground electrodes 230 and 240. Thus, waveguide arms (not shown) may be between electrodes 820 and 830 and electrodes 820 and 840.

Balun 850 includes inputs 852 and 854 and outputs 860 and 862 analogous to inputs 252 and 254 and lines 260 and 262. Balun 850 also includes ground inputs 856 and 858. In addition, ground inputs 856 and 858 have been extended in an analogous manner to balun 600B. Balun also includes line 864 that is coupled with line 862 and ground electrodes 830 and 840. Thus, ground electrodes 830 and 840 are coupled to input 854 receiving negative differential signal S'. Similarly, line 860 is connected with conductive bridge 870 through conductive vias 872 and 874.

In addition, electrodes 820-1, 830-1, and 840-1 may be on the same metallization layer as lines 862, 864, and 860. Electrodes 820-2, 830-2, and 840-2 may be on the same metallization layer as conductive bridge 870. Ground strap 890 is coupled with ground electrodes 830 and 840 through conductive vias 892 and 894. Similarly, ground strap 891 is coupled with ground electrodes 856 and 858 through conductive vias 895 and 893.

Photonics device 800 shares the benefits of photonics devices 100A, 100B, 100C, 100D, 100E, and/or 200. Thus, the advantages of differential drivers and differential driving signals may be combined with the benefits of TFLC electro-optic materials in a single-ended modulator configuration. For example, improved linearity, high speed communications, a large electro-optic effect, and low optical and/or microwave losses may be achieved without suffering a significant reduction in bandwidth or increase in voltage swing that might be present if TFLC optical device 801 were a differential modulator.

In addition, multiple metal layers have been used for various components of photonics device 800. In the embodiment shown, conductive bridge 870, ground strap 891, and electrodes 820-2, 830-2, and 840-2 may be on a different level from remaining metallization of balun 850. This may reduce crosstalk between differential modulators using balun 850. The use of ground straps 890 and 891 may also improve the return loss and transmission of the balun 850. By surrounding balun 850 with ground conductors (i.e. extending ground inputs 856 and 858), the parasitic radiation created by balun 850 may be reduced. This may reduce crosstalk performance. For example, photonics device 800 might include multiple baluns 850 and multiple optical devices 801. For a pitch between baluns 850 of 625 micrometers, adding a joined ground plane (e.g. via ground straps) may reduce crosstalk to less than 22 dB, 30 dB, or below 40 dB (i.e. losses may be between 0 and −22 dB, 0 and −30 dB, or 0 and −40 dB). Thus, performance may be improved.

Figure 9:
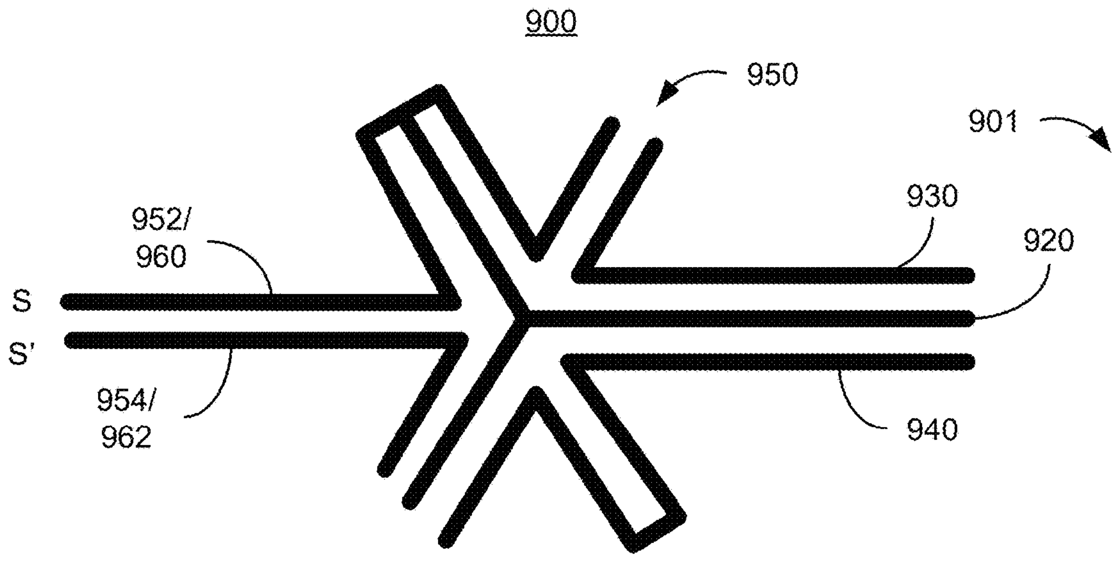
FIG. 9 depicts an embodiment of a portion of a photonics device including a thin film lithium-containing optical device and a balun.

FIG. 9 depicts an embodiment of a portion of a photonics device 900 including thin film lithium-containing optical device 901 and balun 950. FIG. 9 is not to scale. Only a portion of photonics device 900 (i.e., primarily balun 950) is shown. Photonics device 900 may include other and/or additional structures that are not shown for simplicity. Further, although particular configurations are shown, other configurations are possible. For simplicity, only electrical connections are shown. Optical device 901 to which balun 950 is connected may be a modulator and includes a signal electrode and ground electrodes to which signal electrode 920 and ground electrodes 930 and 940 are coupled. Signal electrode 920 and ground electrodes 930 and 940 may thus be considered analogous to signal electrode 220 and ground electrodes 230 and 240. Thus, waveguide arms (not shown) may be between electrodes 920 and 930 and electrodes 920 and 940.

Photonics device 900 shares the benefits of photonics devices 100A, 100B, 100C, 100D, 100E, and/or 200. Thus, the advantages of differential drivers and differential driving signals may be combined with the benefits of TFLC electro-optic materials in a single-ended modulator configuration. For example, improved linearity, high speed communications, a large electro-optic effect, and low optical and/or microwave losses may be achieved without suffering a significant reduction in bandwidth or increase in voltage swing that might be present if TFLC optical device 901 were a differential modulator. In addition, balun 950 has a double Y balun design, including inputs 952/960 and 954/962 analogous to inputs 252 and 254. Balun 950 may provide the desired current splitting between electrodes 930 and 940. In addition, balun 950 may provide an impedance transformation. Further, multiple metal layers (e.g. as for conductive bridge 570) may be avoided. Thus, various balun designs may be used in connection with TFLC optical devices.

Figure 10:
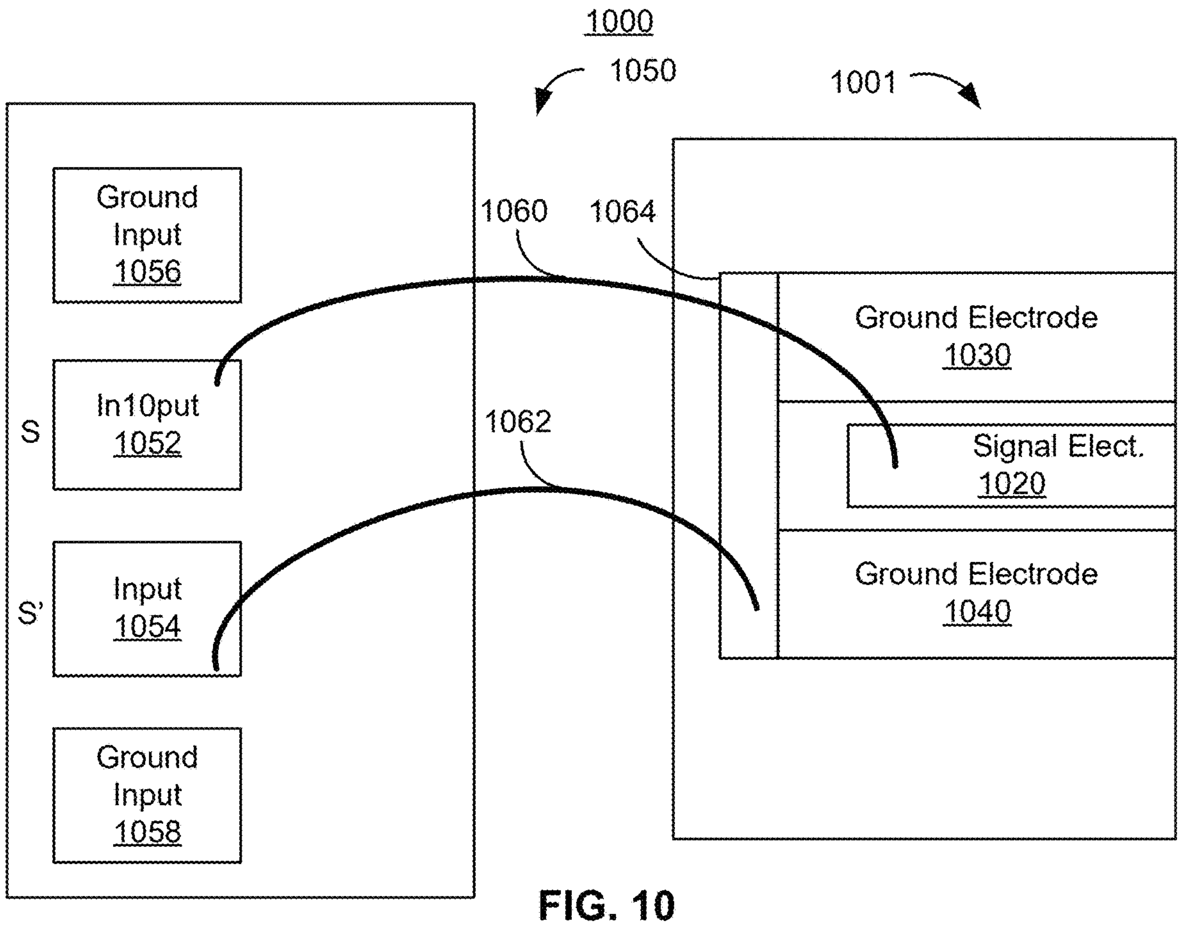
FIG. 10 depicts an embodiment of a portion of a photonics device including a thin film lithium-containing optical device and a balun.

FIG. 10 depicts an embodiment of a portion of a photonics device 1000 including thin film lithium-containing optical device 1001 and balun 1050. FIG. 10 is not to scale. Only a portion of photonics device 1000 (i.e., primarily balun 1050) is shown. Photonics device 1000 may include other and/or additional structures that are not shown for simplicity. Further, although particular configurations are shown, other configurations are possible. For simplicity, only electrical connections are shown. Optical device 1001 to which balun 1050 is connected may be a modulator and includes a signal electrode and ground electrodes to which signal electrode 1020 and ground electrodes 1030 and 1040 are coupled. Signal electrode 1020 and ground electrodes 1030 and 1040 may thus be considered analogous to, the same as, or electrically connected to signal electrode 220 and ground electrodes 230 and 240. Thus, waveguide arms (not shown) may be between electrodes 1020 and 1030 and electrodes 1020 and 1040.

Balun 1050 includes inputs 1052 and 1054 and outputs 1060 and 1062 analogous to inputs 252 and 254 and lines 260 and 262. Balun 1050 also includes ground inputs 1056 and 1058. Balun also includes line 1064 that is coupled with line 1062 and ground electrodes 1030 and 1040. Thus, ground electrodes 1030 and 1040 are coupled to input 1054 receiving negative differential signal S'. Similarly, line 1060 is connected with signal electrode 1020.

As previously discussed, a balun may be integrated in various manners and still be used to drive the signal electrode of an optical device (e.g. an optical modulator). For example, a balun may be integrated into a driver, a DSP, an interposer or other substrate, or a PIC. Balun 1050 may be viewed as extending between an interposer, circuit board, or other substrate and the PIC containing optical device 1001. Balun 1050 is formed using the connection between the interposer and the PIC. In particular, output lines 1060 and 1062 are wire bonds to signal electrode 1020 and line 1064. Thus, wire bonds 1060 and 1062 may be considered to connect inputs 1052 and 1054 (i.e. pads on the interposer) to pads for signal electrode 1020 and ground electrodes 1030 and 1040. The wire bond and pad geometry may be optimized to create a coplanar strip (e.g., pads 1052 and 1054) to coplanar waveguide (e.g. electrodes 1020, 1030, and 1040) balun 1050 having with high performance. For example, in some embodiments wire bonds 1060 and 1062 may each have a length not exceeding one millimeter. In some embodiments, the lengths of wire bonds 1060 and 1062 do not exceed five hundred micrometers. Wire bonds 1060 and 1062 may be at least one hundred micrometers in length. The typical size of pads 1052, 1054, 1064, and 1020 (i.e. the structures being wire bonded) is on the order of one hundred micrometers square.

Photonics device 1000 shares the benefits of photonics devices 100A, 100B, 100C, 100D, 100E, and/or 200. Thus, the advantages of differential drivers and differential driving signals may be combined with the benefits of TFLC electro-optic materials in a single-ended modulator configuration. For example, improved linearity, high speed communications, a large electro-optic effect, and low optical and/or microwave losses may be achieved without suffering a significant reduction in bandwidth or increase in voltage swing that might be present if TFLC optical device 1001 were a differential modulator.

Figure 11:
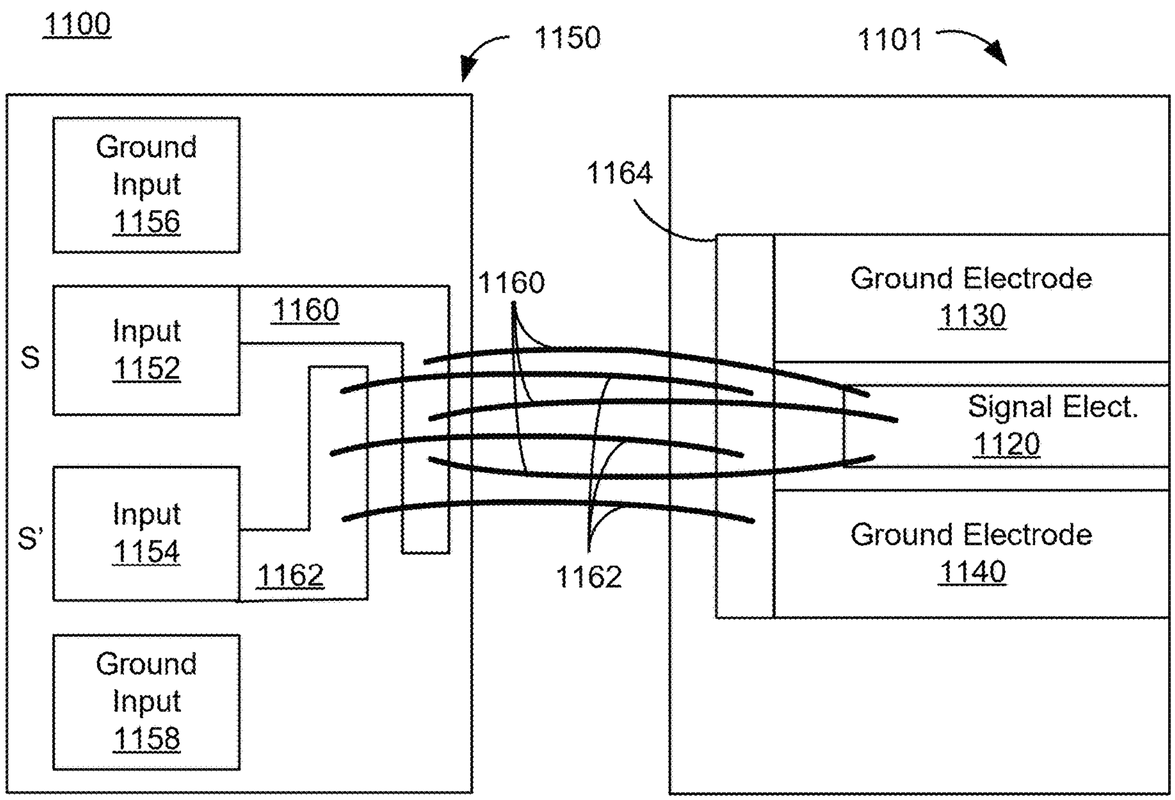
FIG. 11 depicts an embodiment of a portion of a photonics device including a thin film lithium-containing optical device and a balun.

FIG. 11 depicts an embodiment of a portion of a photonics device 1100 including thin film lithium-containing optical device 1101 and balun 1150. FIG. 11 is not to scale. Only a portion of photonics device 1100 (i.e., primarily balun 1150) is shown. Photonics device 1100 may include other and/or additional structures that are not shown for simplicity. Further, although particular configurations are shown, other configurations are possible. For simplicity, only electrical connections are shown. Optical device 1101 to which balun 1150 is connected may be a modulator and includes a signal electrode and ground electrodes to which signal electrode 1120 and ground electrodes 1130 and 1140 are coupled. Signal electrode 1120 and ground electrodes 1130 and 1140 may thus be considered analogous to or the same as signal electrode 220 and ground electrodes 230 and 240. Thus, waveguide arms (not shown) may be between electrodes 1120 and 1130 and electrodes 1120 and 1140.

Balun 1150 includes inputs 1152 and 1154 and outputs 1160 and 1162 analogous to inputs 252/1052 and 254/1054 and lines/wire bonds 260/1060 and 262/1062. Balun 1150 also includes ground inputs 1156 and 1158. Balun also includes line 1164 that is coupled with line 1162 and ground electrodes 1130 and 1140. Thus, ground electrodes 1130 and 1140 are coupled to input 1154 receiving negative differential signal S'. Similarly, line 1160 is connected with signal electrode 1120.

In particular, output lines 1160 and 1162 are wire bonds to signal electrode 1120 and line 1164. Thus, wire bonds 1160 and 1162 may be considered to connect inputs 1152 and 1154 (e.g., pads on an interposer) to pads for signal electrode 1120 and ground electrodes 1130 and 1140. Thus, wire bonds 1160 and 1162 are most analogous to wire bonds 1060 and 1062. However, wire bonds 1160 and 1162 are interleaved. Interleaving of wire bonds 1160 and 1162 results in mutual inductance. This mutual inductance may reduce the total inductance of the wire bonds 1160 and 1162.

Photonics device 1100 shares the benefits of photonics devices 100A, 100B, 100C, 100D, 100E, and/or 200. Further, photonics device 1100 is most analogous to and shares the benefits with photonics device 1000. Thus, the advantages of differential drivers and differential driving signals may be combined with the benefits of TFLC electro-optic materials in a single-ended modulator configuration. For example, improved linearity, high speed communications, a large electro-optic effect, and low optical and/or microwave losses may be achieved without suffering a significant reduction in bandwidth or increase in voltage swing that might be present if TFLC optical device 1101 were a differential modulator.

Figure 12:
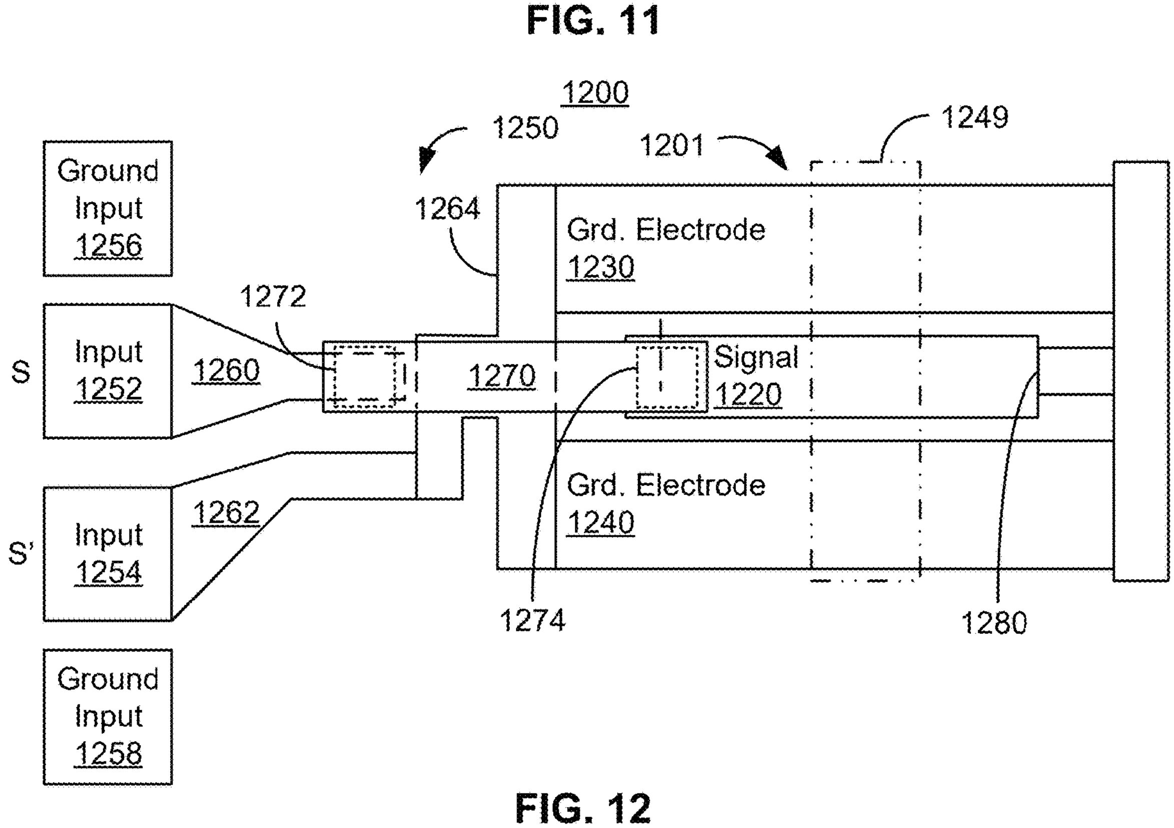
FIG. 12 depicts an embodiment of a portion of a photonics device including a thin film lithium-containing optical device and a balun.

FIG. 12 depicts an embodiment of a portion of a photonics device 1200 including thin film lithium-containing optical device 1201 and balun 1250. FIG. 12 is not to scale. Only a portion of photonics device 1200 (i.e., primarily balun 1250) is shown. Photonics device 1200 may include other and/or additional structures that are not shown for simplicity. Further, although particular configurations are shown, other configurations are possible. For simplicity, only electrical connections are shown. Optical device 1201 may be a modulator and includes signal electrode 1220 and ground electrodes 1230 and 1240. Signal electrode 1220 and ground electrodes 1230 and 1240 may thus be considered analogous to signal electrode 220 and ground electrodes 230 and 240. Thus, waveguide arms (not shown) may be between electrodes 1220 and 1230 and electrodes 1220 and 1240.

Balun 1250 includes inputs 1252 and 1254 and lines 1260 and 1262 analogous to inputs 252 and 254 and lines 260 and 262. Balun 1250 also includes ground inputs 1256 and 1258. Balun also includes line 1264 that is coupled with line 1262 and ground electrodes 1230 and 1240. Thus, ground electrodes 1230 and 1240 are coupled to input 1254 receiving negative differential signal S'. Similarly, line 1260 is connected with conductive bridge 1270 through conductive vias 1272 and 1274. In some embodiments, bridge 1270 is, therefore, on a different level (i.e. is a different metallization layer), than some or all of the remaining electrical components shown. Balun 1250 may thus be analogous to balun 650A. Also indicated is modulation region 1249. For clarity, this portion 1249 of TFLC optical device 1201 has been compressed in size and detail to focus on balun 1250 and termination network 1280.

Termination network 1280 is used to terminate the differential input mode with high return loss (e.g., greater than 5 dB). For example, termination network 1280 may simply be resistor or other device(s). The termination impedance of termination network 1280 may be selected to control the frequency response of modulator 1201. For example, a high termination impedance (such as that matched to the differential input impedance for balun 1250) may improve the low-frequency response of the modulator 1201.

Photonics device 1200 shares the benefits of photonics devices 100A, 100B, 100C, 100D, 100E, and/or 200. Thus, the advantages of differential drivers and differential driving signals may be combined with the benefits of TFLC electro-optic materials in a single-ended modulator configuration. For example, improved linearity, high speed communications, a large electro-optic effect, and low optical and/or microwave losses may be achieved without suffering a significant reduction in bandwidth or increase in voltage swing that might be present if TFLC optical device 1201 were a differential modulator. In addition, termination network 1280 may improve the low frequency response of optical device 1201.

Figure 13:
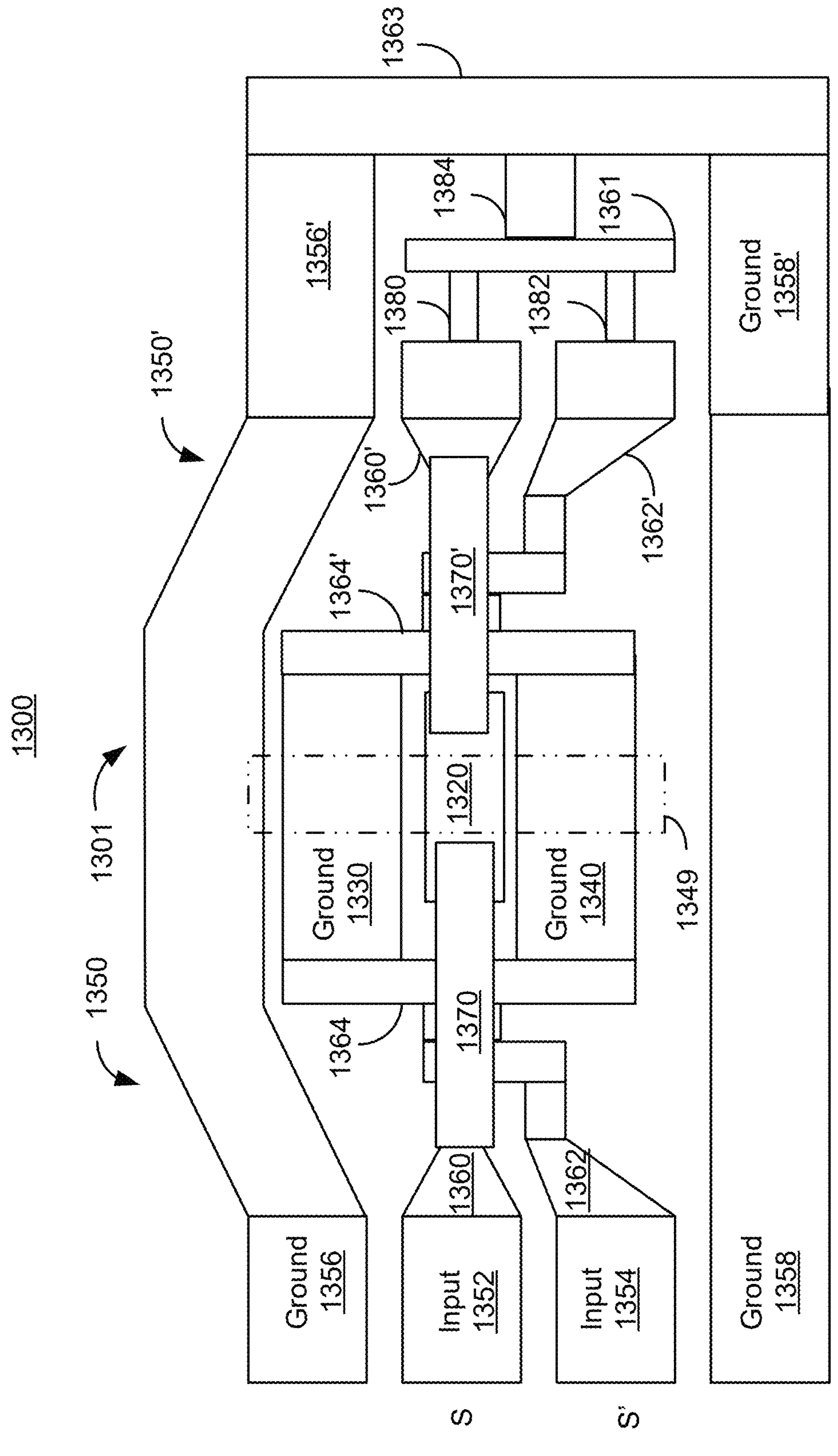
FIG. 13 depicts an embodiment of a portion of a photonics device including a thin film lithium-containing optical device and a balun.

FIG. 13 depicts an embodiment of a portion of a photonics device 1300 including thin film lithium-containing optical device 1301 and balun 1350. FIG. 13 is not to scale. Only a portion of photonics device 1300 is shown. Photonics device 1300 may include other and/or additional structures that are not shown for simplicity. Further, although particular configurations are shown, other configurations are possible. For simplicity, only electrical connections are shown. Optical device 1301 may be a modulator and include signal electrode 1320 and ground electrodes 1330 and 1340. Signal electrode 1320 and ground electrodes 1330 and 1340 may thus be considered analogous to or the same as signal electrode 220 and ground electrodes 230 and 240. Thus, waveguide arms (not shown) may be between electrodes 1320 and 1330 and electrodes 1320 and 1340.

Balun 1350 includes inputs 1352 and 1354 and lines 1360 and 1362 analogous to inputs 252 and 254 and lines 260 and 262. Balun 1350 also includes ground inputs 1356 and 1358. Balun also includes line 1364 that is coupled with line 1362 and ground electrodes 1330 and 1340. Thus, ground electrodes 1330 and 1340 are coupled to input 1354 receiving negative differential signal S'. Similarly, line 1360 is connected with conductive bridge 1370 through conductive vias (not explicitly shown). In some embodiments, bridge 1370 is, therefore, on a different level (i.e. is a different metallization layer), than some or all of the remaining electrical components shown. Balun 1350 may thus be analogous to balun 1250. Also indicated is modulation region 1349. For clarity, this portion 1349 of TFLC optical device 1301 has been compressed in size and detail to focus on balun 1350 and termination of signal electrode 1320.

In photonics device 1300, termination for optical device 1301 is accomplished using unbal 1350', which has the opposite function as a balun. Unbal 1350' transitions from a single-ended line (signal electrode 1320) to a balanced, or differential, line. Unbal 1350' includes ground electrodes 1356' and 1358', bridge 1370', lines 1360', 1361, 1362', 1363, and 1364' as well as conductive vias (not shown) connecting signal electrode 1320 to bridge 1370'. Lines 1360', 1362', 1364' and bridge 1370' are analogous to lines 1360, 1362, 1364 and bridge 1370. Termination networks 1380 and 1382 and network 1384 are also present. In some embodiments, termination networks 1380 and 1382 may be resistors analogous to termination network 1280.

In addition to providing termination, the use of unbal 1350' provides more convenient access to the differential pair. Ground 1358 and 1356 from the differential input to balun 1350 are extended through optical device 1301. This true ground allows electrical network 1384 to be inserted in a T-section configuration between the termination 1380 and 1382 and ground 1363. Network 1384 may be used to increase the common mode return loss (e.g. using a resistor or capacitor) and/or provide a DC bias current for an open collector driver circuit (e.g. using a voltage or current source and/or an inductive choke).

Photonics device 1300 shares the benefits of photonics devices 100A, 100B, 100C, 100D, 100E, and/or 200. Thus, the advantages of differential drivers and differential driving signals may be combined with the benefits of TFLC electro-optic materials in a single-ended modulator configuration. For example, improved linearity, high speed communications, a large electro-optic effect, and low optical and/or microwave losses may be achieved without suffering a significant reduction in bandwidth or increase in voltage swing that might be present if TFLC optical device 1301 were a differential modulator. In addition, termination networks 1380 and 1382, unbal 1350' and network 1384 may further improve performance of optical device 1301.

Figure 14:
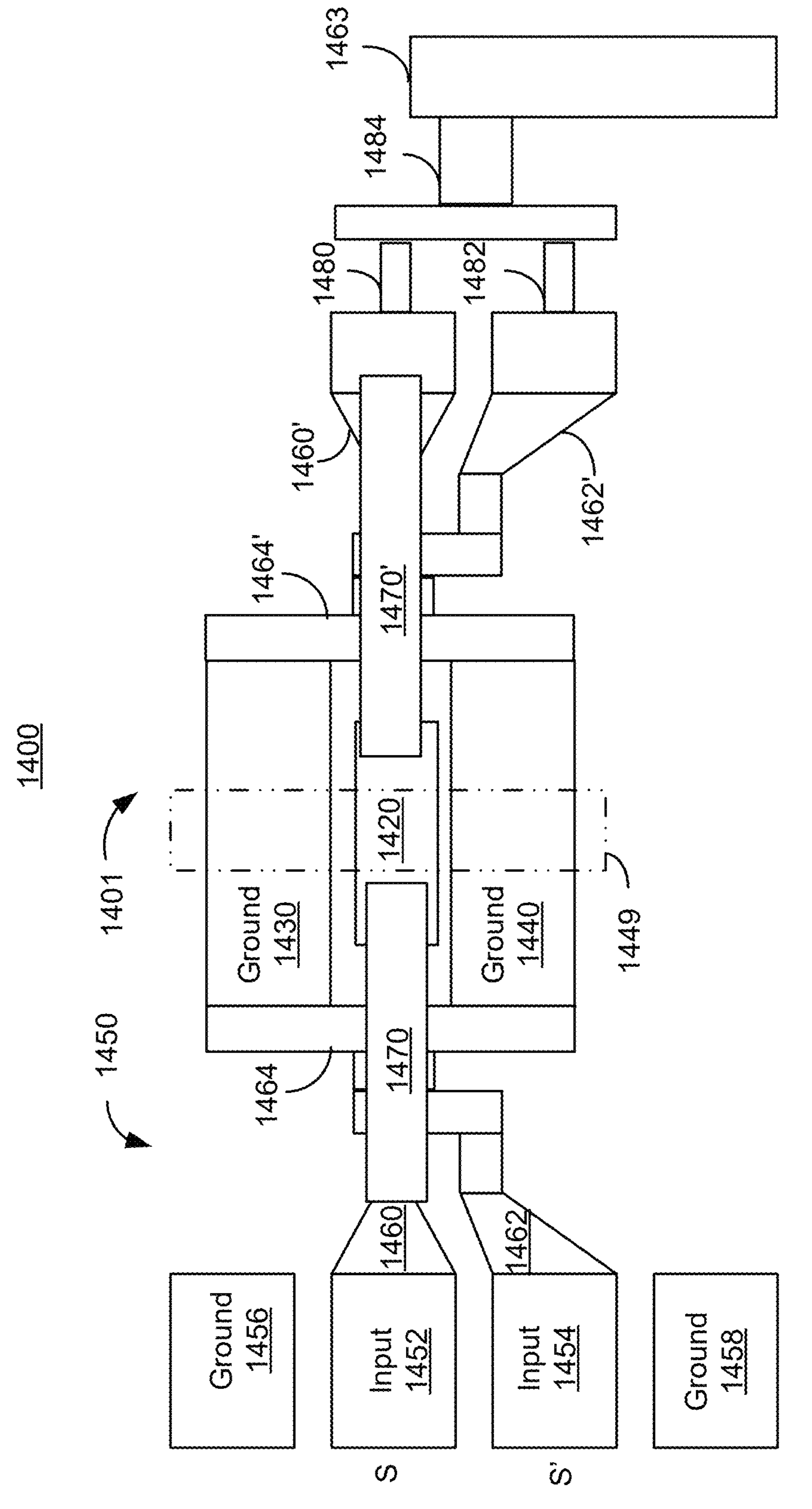
FIG. 14 depicts an embodiment of a portion of a photonics device including a thin film lithium-containing optical device and a balun.

FIG. 14 depicts an embodiment of a portion of a photonics device 1400 including thin film lithium-containing optical device 1401 and balun 1450. FIG. 14 is not to scale. Only a portion of photonics device 1400 (i.e., primarily balun 1450) is shown. Photonics device 1400 may include other and/or additional structures that are not shown for simplicity. Further, although particular configurations are shown, other configurations are possible. For simplicity, only electrical connections are shown. Optical device 1401 may be a modulator and includes signal electrode 1420 and ground electrodes 1430 and 1440. Signal electrode 1420 and ground electrodes 1430 and 1440 may thus be considered analogous to or the same as signal electrode 220 and ground electrodes 230 and 240. Thus, waveguide arms (not shown) may be between electrodes 1420 and 1430 and electrodes 1420 and 1440.

Balun 1450 includes inputs 1452 and 1454 and lines 1460 and 1462 analogous to inputs 252 and 254 and lines 260 and 262. Balun 1450 also includes ground inputs 1456 and 1458. Balun also includes line 1464, which is coupled with line 1462 and ground electrodes 1430 and 1440. Thus, ground electrodes 1430 and 1440 are coupled to input 1454 receiving negative differential signal S'. Similarly, line 1460 is connected with signal electrode 1420 through conductive bridge 1470 and conductive vias (not explicitly shown). In some embodiments, bridge 1470 is, therefore, on a different level (i.e. is a different metallization layer), than some or all of the remaining electrical components shown. Balun 1450 may thus be analogous to balun 1250. Also indicated is modulation region 1449. For clarity, this portion 1449 of TFLC optical device 1401 has been compressed in size and detail to focus on balun 1450 and termination of signal electrode 1420.

In photonics device 1400, termination for optical device 1401 is accomplished using an unbal 1450'. Unbal 1450' includes bridge 1470', lines 1460', 1462', and 1464' as well as conductive vias (not shown) connecting signal electrode 1420 to bridge 1470'. Lines 1460', 1462', 1464' and bridge 1470' are analogous to lines 1460, 1462, 1464 and bridge 1470. Line 1463 may be connected to ground or a voltage supply for an open collector driver. Thus, a separate ground is provided for unbal 1450'. Termination networks 1480 and 1482 and network 1484 are also present. In some embodiments, termination networks 1480 and 1482 may be resistors analogous to termination network 1280, 1380, and 1382. Network 1484 is analogous to network 1384. Unbal 1450' provides analogous benefits to unbal 1350'.

Photonics device 1400 shares the benefits of photonics devices 100A, 100B, 100C, 100D, 100E, and/or 200. Thus, the advantages of differential drivers and differential driving signals may be combined with the benefits of TFLC electro-optic materials in a single-ended modulator configuration. For example, improved linearity, high speed communications, a large electro-optic effect, and low optical and/or microwave losses may be achieved without suffering a significant reduction in bandwidth or increase in voltage swing that might be present if TFLC optical device 1401 were a differential modulator. In addition, termination networks 1480 and 1482, unbal 1450' and network 1484 may further improve performance of optical device 1401.

Figure 15:
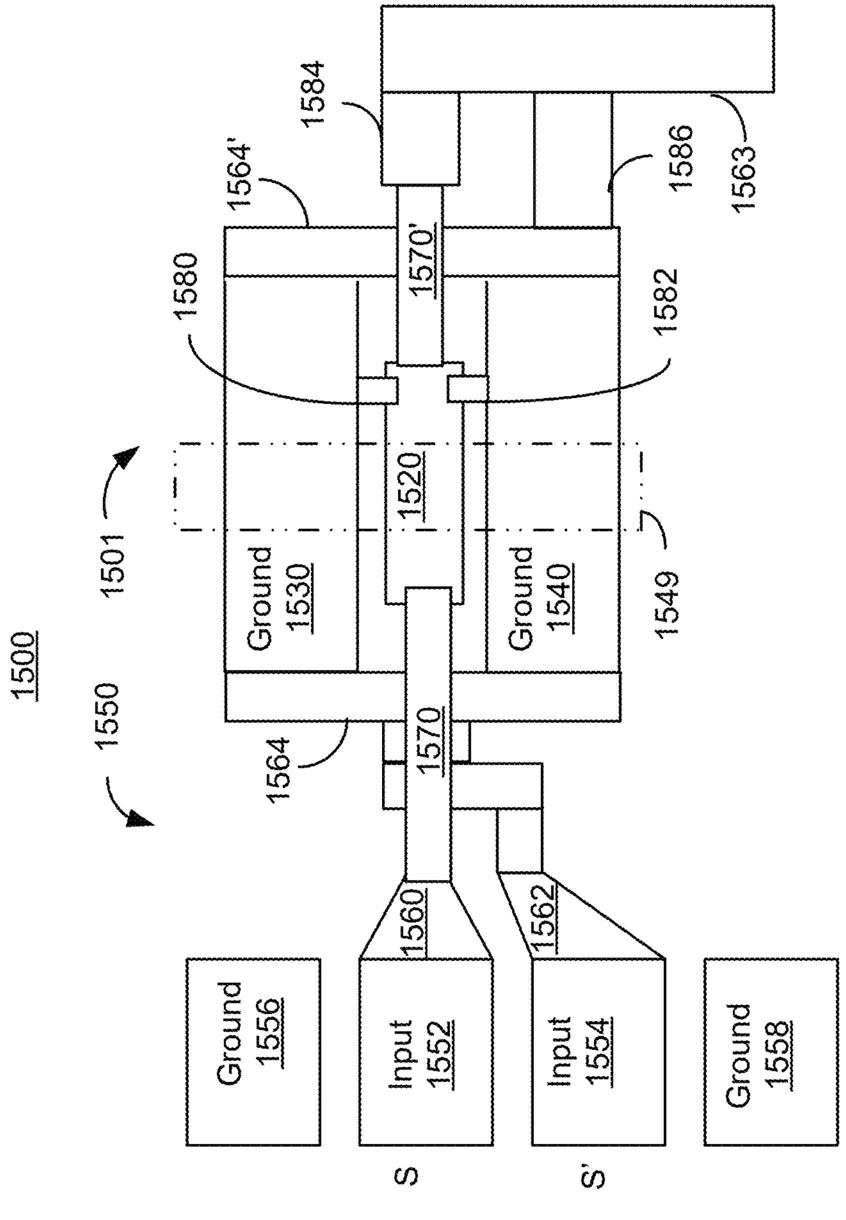
FIG. 15 depicts an embodiment of a portion of a photonics device including a thin film lithium-containing optical device and a balun.

FIG. 15 depicts an embodiment of a portion of a photonics device 1500 including thin film lithium-containing optical device 1501 and balun 1550. FIG. 15 is not to scale. Only a portion of photonics device 1500 (i.e., primarily balun 1550) is shown. Photonics device 1500 may include other and/or additional structures that are not shown for simplicity. Further, although particular configurations are shown, other configurations are possible. For simplicity, only electrical connections are shown. Optical device 1501 may be a modulator and includes signal electrode 1520 and ground electrodes 1530 and 1540. Signal electrode 1520 and ground electrodes 1530 and 1540 may thus be considered analogous to or the same as signal electrode 220 and ground electrodes 230 and 240. Thus, waveguide arms (not shown) may be between electrodes 1520 and 1530 and electrodes 1520 and 1540.

Balun 1550 includes inputs 1552 and 1554 and lines 1560 and 1562 analogous to inputs 252 and 254 and lines 260 and 262. Balun 1550 also includes ground inputs 1556 and 1558. Balun also includes line 1564 that is coupled with line 1562 and ground electrodes 1530 and 1540. Thus, ground electrodes 1530 and 1540 are coupled to input 1554 receiving negative differential signal S'. Similarly, line 1560 is connected with signal electrode 1520 through conductive bridge 1570 and conductive vias (not explicitly shown). In some embodiments, bridge 1570 is, therefore, on a different level (i.e. is a different metallization layer), than some or all of the remaining electrical components shown. Balun 1550 may thus be analogous to balun 1250. Also indicated is modulation region 1549. For clarity, this portion 1549 of TFLC optical device 1501 has been compressed in size and detail to focus on balun 1550 and termination of signal electrode 1520.

In photonics device 1500, termination for optical device 1501 is accomplished using a pi-section type termination used with duplicate networks 1584 and 1586. This termination design does not require using an unbal. Pi-section termination does utilize conductive bridge 1570' connecting signal electrode 1520 to network 1584 and termination networks 1580 and 1582 coupling signal electrode 1520 to ground. Line 1563 may be connected to ground or a voltage supply for an open collector driver. In some embodiments, termination networks 1580 and 1582 may be resistors analogous to termination network 1280, 1380, and 1382. Network 1584 is analogous to network 1384.

Photonics device 1500 shares the benefits of photonics devices 100A, 100B, 100C, 100D, 100E, and/or 200. Thus, the advantages of differential drivers and differential driving signals may be combined with the benefits of TFLC electro-optic materials in a single-ended modulator configuration. For example, improved linearity, high speed communications, a large electro-optic effect, and low optical and/or microwave losses may be achieved without suffering a significant reduction in bandwidth or increase in voltage swing that might be present if TFLC optical device 1501 were a differential modulator. In addition, termination networks 1580 and 1582, and pi-type termination through network 1584 and 1586 may further improve performance of optical device 1501.

Figure 16A:
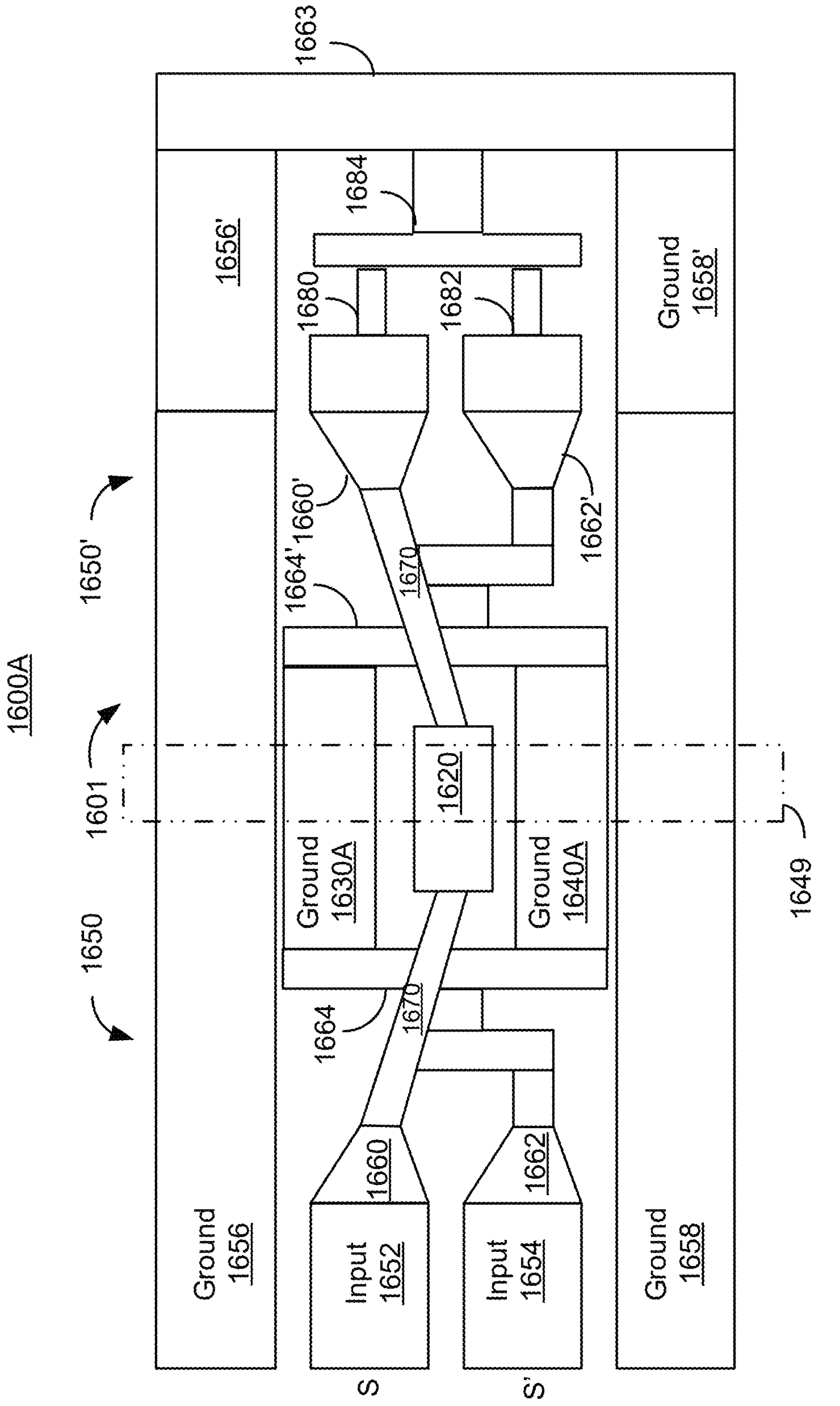
FIGS. 16A-16B depict embodiments of a portion of photonics devices including a thin film lithium-containing optical device and a balun.
Figure 16B:
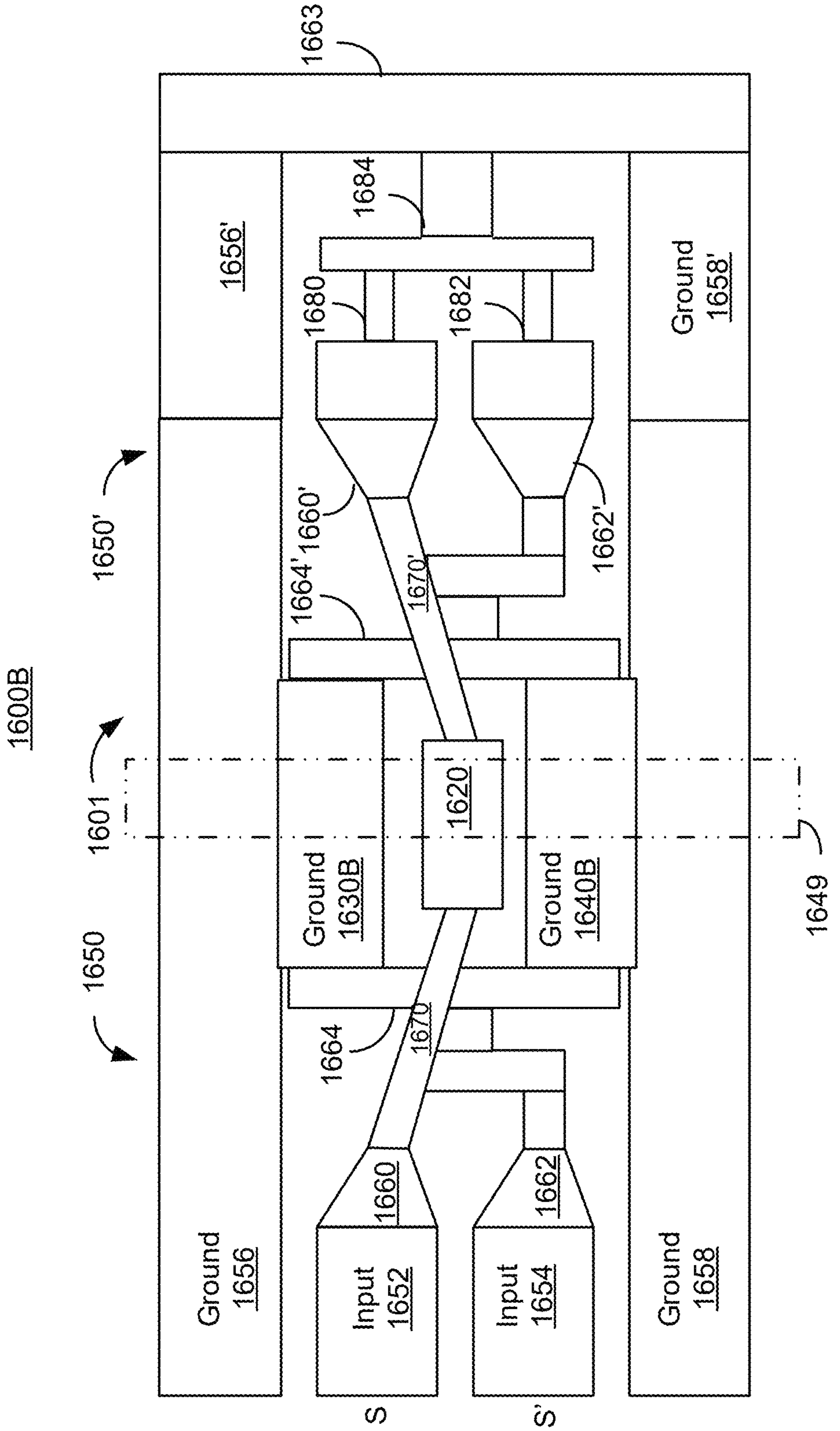
Figure 17A:
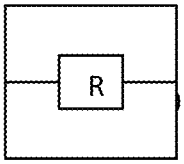
FIGS. 17A-17D depict embodiments of a portion of termination networks usable with photonics devices including a thin film lithium-containing optical device and a balun.
Figure 17B:
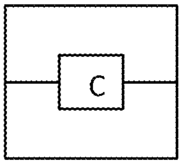
Figure 17C:
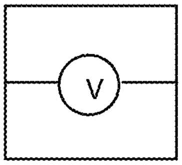
Figure 17D:
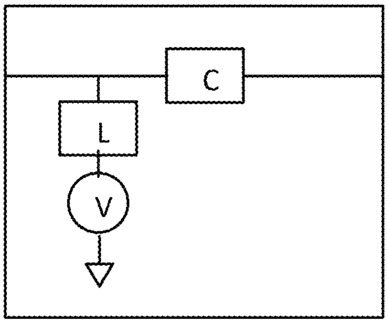

FIGS. 16A-16B depict embodiments of a portion of photonics devices 1600A and 1600B including TFLC optical device 1601 and balun 1650. FIGS. 16A and 16B are not to scale. Only a portion of photonics devices 1600A and 1600B are shown. Photonics devices 1600A and 1600B may include other and/or additional structures that are not shown for simplicity. Further, although particular configurations are shown, other configurations are possible. For simplicity, only electrical connections are shown. Optical devices 1601 may each be a modulator and include signal electrode 1620 and ground electrodes 1630A/1630B and 1640A/1640B. Signal electrode 1620 and ground electrodes 1630A/1630B and 1640A/1640B may thus be considered analogous to or the same as signal electrode 220 and ground electrodes 230 and 240. Thus, waveguide arms (not shown) may be between electrodes 1620 and 1630A/1630B and electrodes 1620 and 1640A/1640B.

Balun 1650 includes inputs 1652 and 1654 and lines 1660 and 1662 analogous to inputs 252 and 254 and lines 260 and 262. Balun 1650 also includes ground inputs 1656 and 1658. Balun also includes line 1664 that is coupled with line 1662 and ground electrodes 1630A/1630B and 1640A/1640B. Thus, ground electrodes 1630A/1630B and 1640A/1640B are coupled to input 1654 receiving negative differential signal S'. Similarly, line 1660 is connected with conductive bridge 1670 through conductive vias (not explicitly shown). In some embodiments, bridge 1670 is, therefore, on a different level (i.e. is a different metallization layer), than some or all of the remaining electrical components shown. Balun 1650 may thus be analogous to balun 1250. Also indicated is modulation region 1649. For clarity, this portion 1649 of TFLC optical device 1601 has been compressed in size and detail to focus on balun 1650 and termination of signal electrode 1620.

In photonics devices 1600A and 1600B, termination for optical device 1601 is accomplished through unbal 1650' that is analogous to unbal 1350' and 1450'. Unbal 1650' utilizes conductive bridge 1670' connecting signal electrode 1620 to network line 1660', lines 1662' and 1664' connected to ground electrodes 1630A/1630B and 1640A/1640B. Lines 1660' and 1662' are coupled to termination networks 1680 and 1682 and network 1684. Network 1684 is coupled to ground through line 1663. In some embodiments, termination networks 1680 and 1682 may be resistors analogous to termination network 1280, 1380, and 1382. Network 1684 is analogous to network 1384.

Referring to FIG. 16A, grounds 1656 and 1658 have been extended along the length of the modulator 1601 and connected to ground electrodes 1658' and 1656'. This may be used to reduce common mode reflection and common mode crosstalk. Extension of ground electrodes 1656 and 1658 may also help to extinguish propagation of unwanted modes in the line 1620. Optionally, these outer ground conductors may be connected to the driver (or trace/PCB), or they may be left floating. Ground electrodes 1656 and 1658 may be connected to each other at the far end (termination end) of TFLC optical device by line 1663. In some embodiments, grounds 1656 and 1658 may be left disconnected. Optionally, ground electrodes 1656 and 1658 may be connected to the modulator termination using termination network 1684.

Referring to FIG. 16B, photonics device 1600B is analogous to photonics device 1600A. However, ground electrodes 1630B and 1640B have been connected to grounds 1656 and 1658, respectively. In such applications, inputs 1652 and 1654 may be AC-coupled to the driver. Alternatively, the outer ground traces 1656 and 1658 may not be connected to the driver. In these cases, the outer ground electrodes 1656 and 1658 may be electrically connected or 'shorted' to the 'inner' ground traces 1630B and 1640B of optical device 1601, as shown.

Photonics devices 1600A and 1600B share the benefits of photonics devices 100A, 100B, 100C, 100D, 100E, and/or 200. Thus, the advantages of differential drivers and differential driving signals may be combined with the benefits of TFLC electro-optic materials in a single-ended modulator configuration. For example, improved linearity, high speed communications, a large electro-optic effect, and low optical and/or microwave losses may be achieved without suffering a significant reduction in bandwidth or increase in voltage swing that might be present if TFLC optical device 1601 were a differential modulator. In addition, termination networks 1680 and 1682, unbals 1650', termination through network 1684, and the configuration of ground electrodes 1630A/1630B and 1640A/1640B may further improve performance of optical device 1601.

FIGS. 17A-17D depict embodiments of a portion of termination networks 1700A, 1700B, 1700C, and 1700D usable with photonics devices including TFLC optical devices and a balun. For example, termination network(s) 1700A, 1700B, 1700C, and/or 1700D may be used for termination networks 1580 and 1582 and/or networks 1586 and 1588. Termination network 1700A includes a termination resistor used to improve common mode return loss. For example, the resistance of the termination resistor may be on the order of 10-100 Ohms. Termination network 1700B includes a termination capacitor used to improve common mode return loss at higher frequencies. For example, the capacitance of the termination capacitor may be 1-100 nF. Termination network 1700C includes a voltage source for an open collector driver. Termination network 1700D is a bias network used for an open collector driver architecture. Bias network 1700D includes a capacitor, an inductor, and a voltage source. For example, the capacitance of the capacitor may be in the range 1-100 nF, the inductance of the inductor may be in the range of 0-100 nH, the voltage of the voltage source may be about 1-5V. Thus, using one or more of termination networks 1700A, 1700B, 1700C and/or 1700D, performance of photonics devices may be improved.

Figure 18:
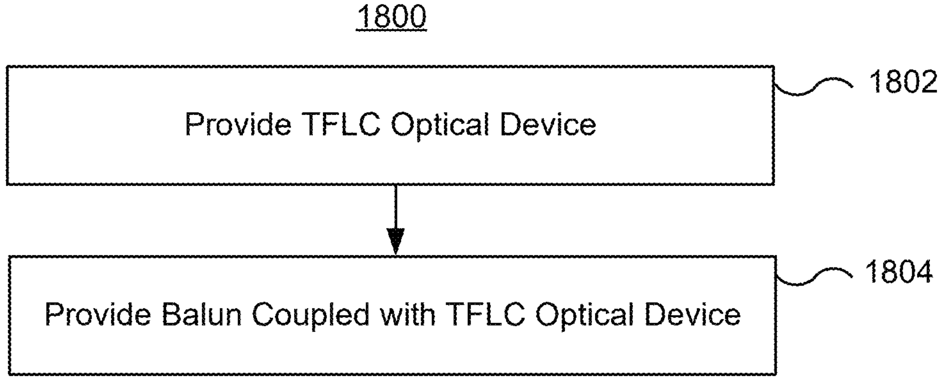
FIG. 18 is a flow-chart depicting an embodiment of a method for providing a photonics device including a thin film lithium-containing optical device and a balun.

FIG. 18 is a flow-chart depicting an embodiment of method 1800 for providing a photonics device including a thin film lithium-containing optical device and a balun. Method 1800 is described in the context of processes that may have sub-processes. Although described in a particular order, another order not inconsistent with the description herein may be utilized. For example, in some embodiments, portions of processes may be interleaved. Method 1800 is also described in the context of photonics devices 200 and 1000. However, method 1800 may be used with other photonics devices including but not limited to photonics packages 100A, 100B, 100C, 100D, 100E, 300A, 300B, 400A, 400B, 500, 600A, 600B, 700, 800, 900, 1100, 1200, 1300, 1400, 1500, 1600A, and 1600B.

The TFLC optical device(s) are provided, at 1802. Thus, the waveguides, electrodes, and/or other structures for the TFLC optical device(s) on the TFLC PIC are provided. The balun for the TFLC optical device(s) are provided and integrated with the TFLC optical device(s), at 1804.

For example, TFLC modulator 201 may be provided at 1802. This may include forming electrodes 220, 230, and 240, waveguide 210, and other structures, such as cladding 248. At 1804, balun 250 may be formed and integrated with TFLC optical device 201. Thus, inputs 252 and 254 and conductive lines 260 and 262 may be provided. In another example, optical device 1001 may be formed at 1802. Balun 1050 may be formed at 1804 by forming inputs 1052, 1054, 1056, and 1058 and coupling inputs 1052 and 1054 to electrodes 1020, 1030 and 1040 via wire bonds 1060 and 1062.

Thus, using method 1800, photonic devices utilizing baluns to drive single-ended optical devices with differential signals may be formed. Consequently, the benefits described herein may be achieved.

Figure 19:
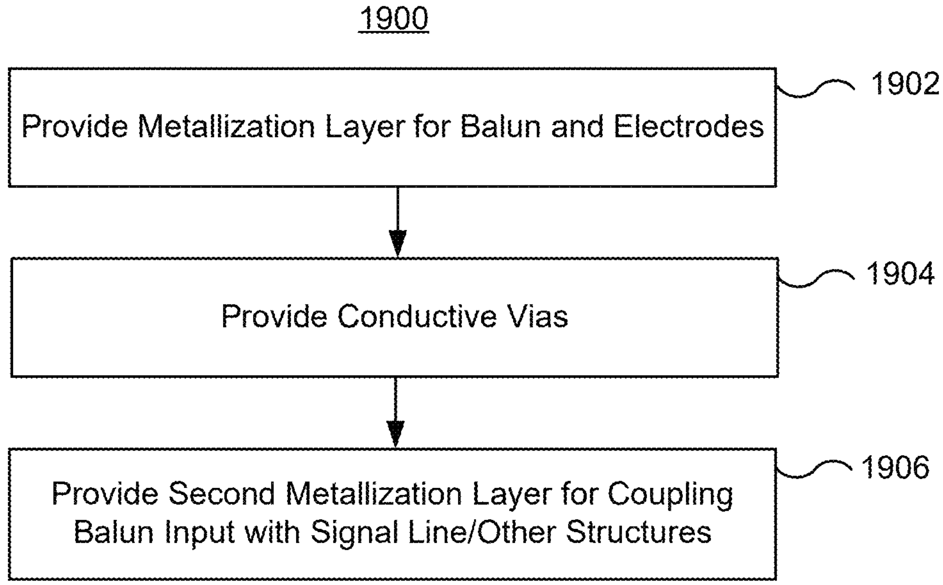
FIG. 19 is a flow-chart depicting an embodiment of a method for providing a photonics device including a thin film lithium-containing optical device and a balun.

FIG. 19 is a flow-chart depicting an embodiment of a method for providing a photonics device including a thin film lithium-containing optical device and a balun. Method 1900 is described in the context of processes that may have sub-processes. Although described in a particular order, another order not inconsistent with the description herein may be utilized. For example, in some embodiments, portions of processes may be interleaved. For example, method 1900 describes formation of the electrical portions of the devices. Waveguides and other analogous structures may be separately formed. Method 1900 is also described in the context of photonics device 500. However, method 1900 may be used with other photonics devices including but not limited to photonics packages 100A, 100D, 100E, 200, 300A, 300B, 400A, 400B, 500, 600A, 600B, 700, 800, 900, 1000, 1100, 1200, 1300, 1400, 1500, 1600A, and 1600B. However, method 1900 is used for the balun integrated with the optical device.

At 1902, a layer of metallization is provided for the balun and metal structures in the optical device. For example, the first metallization layer may form the signal electrode for the TFLC optical device as well as the first input, the second input, and the ground inputs of the balun. Also at 1902, the ground electrodes may be formed. In addition, conductive vias for the signal electrode and the first output are provided. At 1904, conductive vias are formed at the desired locations. Thus, materials covering the first metallization layer may be removed to form apertures at the desired locations. The apertures may be filled with a conductive material. Consequently, electrical contact may be made to the structures formed at 1902. Another (e.g., second) layer of metallization is provided, at 1906. Electrical contact is thus made to the conductive vias. The second layer of metallization is, therefore, electrically coupled to the first layer of metallization through the vias. Thus, by properly locating and shaping the desired layers of metallization and conductive vias, the photonics device including TFLC optical devices and baluns may be formed.

For example, at 1902, ground electrodes 530 and 540, signal electrode 520, inputs 552, 554, 556, and 558 and lines 560, 562, and 564 are formed. Conductive vias 572 and 574 are formed at 1904. Conductive bridge 570 may be formed at 1906. Consequently, balun 550 and the corresponding portions of optical device 501 may be formed. Thus, using method 1900, the desired optical devices and baluns may be formed. Consequently, the benefits described herein may be achieved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A photonics device, comprising:

an optical device including:

a waveguide including a lithium-containing electro-optic material; and a signal electrode that varies an electric field at the waveguide;

a balun configured to convert a differential input signal to a single-ended output signal, the balun being connected to the signal electrode and providing the signal electrode with the single-ended output signal, the differential input signal including a positive signal and a negative signal, the balun further including:

a first input configured to receive the positive signal;

a second input configured to receive the negative signal;

a first output coupled to the signal electrode and providing the positive signal to the signal electrode; and a second output coupled with a plurality of ground electrodes of the optical device, the second output providing the negative signal to the plurality of ground electrodes.

2. The photonics device of claim 1, wherein the optical device is a traveling wave modulator.

3. The photonics device of claim 1, wherein the first input and the second input are connected to at least one of a digital signal processor and a differential driver.

4. The photonics device of claim 1, wherein the second output divides a current for the negative signal evenly between the plurality of ground electrodes.

5. The photonics device of claim 1, wherein at least one of the first input or the second input is tapered.

6. The photonics device of claim 1, further comprising:

a termination network, at least a first portion of the termination network being coupled with a portion of the signal electrode.

7. The photonics device of claim 6, wherein a second portion of the termination network is coupled with the plurality of ground electrodes.

8. The photonics device of claim 1, wherein the balun further comprises:

a first ground input; and a second ground input, and wherein the first ground input and the second ground input are coupled with an additional plurality of grounds of the optical device.

9. The photonics device of claim 8, wherein the additional plurality of grounds is coupled with the plurality of ground electrodes.

10. The photonics device of claim 1, wherein a portion of each of the plurality of ground electrodes has a first width, the signal electrode has a second width, and the first width is at least twice the second width.

11. The photonics device of claim 1, wherein the first output and the second output further comprises:

a plurality of wire bonds coupling the positive signal to the signal electrode and the negative signal to the plurality of ground electrodes of the optical device.

12. The photonics device of claim 11, wherein a first portion of the plurality of wire bonds couple the positive signal to the signal electrode and a second portion of the plurality of wire bonds couple the negative signal to the plurality of ground electrodes, first wire bonds of the first portion of the plurality of wire bonds being interleaved with second wire bonds of the second portion of the plurality of wire bonds.

13. The photonics device of claim 1, wherein the optical device is in a photonics integrated circuit, at least a portion of the balun being integrated into the photonics integrated circuit.

14. The photonics device of claim 12, wherein the balun is integrated into the photonics device.

15. A photonics integrated circuit (PIC), comprising:

an optical modulator including:

a waveguide including a lithium-containing electro-optic material; and a signal electrode that varies an electric field for the waveguide, the optical modulator being a traveling wave modulator; and a balun having a plurality of inputs and being configured to convert a differential input signal to a single-ended output signal, the balun receiving the differential input signal at the plurality of inputs, being connected to the signal electrode, and providing the signal electrode with the single-ended output signal, the differential input signal including a positive signal and a negative signal, the plurality of inputs receiving the positive signal and the negative signal, the balun further including:

a first output coupled to the signal electrode and providing the positive signal to the signal electrode; and a second output coupled with a plurality of ground electrodes of the optical modulator, the second output providing the negative signal to the plurality of ground electrodes.

16. The PIC of claim 15, wherein the optical modulator includes a first region proximate to the balun, a modulation region, and a second region, the modulation region being between the first region and the second region, the second region further comprising:

a termination network coupled with the signal electrode.

17. A method, comprising:

providing an optical device including a waveguide and a signal electrode, the waveguide including a lithium-containing electro-optic material; and providing a balun configured to convert a differential input signal to a single-ended output signal, the balun being connected to the signal electrode and providing the signal electrode with the single-ended output signal, the differential input signal including a positive signal and a negative signal, the balun further including a first input configured to receive the positive signal, a second input configured to receive the negative signal, a first output coupled to the signal electrode and providing the positive signal to the signal electrode, and a second output coupled with a plurality of ground electrodes of the optical device, the second output providing the negative signal to the plurality of ground electrodes, wherein the providing the balun further includes:

providing a first metallization layer including the signal electrode, the first input, the second input, and the plurality of ground electrodes;

providing a plurality of conductive vias for the signal electrode and the first output; and providing a second metallization layer coupling the first output with the signal electrode through the plurality of conductive vias.

* * * * *